(12) United States Patent
Ryu et al.

(10) Patent No.: US 8,829,724 B2
(45) Date of Patent: Sep. 9, 2014

(54) WIRELESS POWER TRANSCEIVER AND WIRELESS POWER SYSTEM

(75) Inventors: Young Ho Ryu, Yongin-si (KR); Eun Seok Park, Suwon-si (KR); Sang Wook Kwon, Seongnam-si (KR); Young Tack Hong, Seongnam-si (KR); Nam Yun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 909 days.

(21) Appl. No.: 12/956,210

(22) Filed: Nov. 30, 2010

(65) Prior Publication Data

US 2011/0127848 A1    Jun. 2, 2011

(30) Foreign Application Priority Data

Nov. 30, 2009    (KR) .................. 10-2009-0116387
Oct. 26, 2010    (KR) .................. 10-2010-0104370

(51) Int. Cl.
*H01F 27/42* (2006.01)
*H01F 37/00* (2006.01)
*H01F 38/00* (2006.01)
*H02J 5/00* (2006.01)

(52) U.S. Cl.
CPC ........................ *H02J 5/005* (2013.01)
USPC .......................................... 307/104

(58) Field of Classification Search
USPC .......................... 307/104; 320/108
See application file for complete search history.

(56) References Cited

U.S. PATENT DOCUMENTS

| | | | |
|---|---|---|---|
| 2007/0080804 A1 | 4/2007 | Hirahara et al. | |
| 2008/0001758 A1 | 1/2008 | Bhogal et al. | |
| 2009/0286470 A1 | 11/2009 | Mohammadian et al. | |
| 2010/0264747 A1 * | 10/2010 | Hall et al. | 307/104 |
| 2011/0115430 A1 * | 5/2011 | Saunamki | 320/108 |

FOREIGN PATENT DOCUMENTS

| | | |
|---|---|---|
| JP | 2008-335372 | 7/2010 |
| KR | 10-2002-0007117 A | 1/2002 |
| WO | WO 2009/037380 A1 | 3/2009 |
| WO | WO 2009/111597 A2 | 9/2009 |

OTHER PUBLICATIONS

International Search Report issued Aug. 29, 2011, in counterpart International Application No. PCT/KR2010/008311 (4 pages, in English).
Chinese Office Action issued Apr. 4, 2014 in counterpart Chinese Patent Application No. 2010800538777 (8 pages, in Chinese).
Japanese Office Action issued in Apr. 30, 2014 in counterpart Japanese Patent Application No. 2012-541938 (5 pages, in Japanese with English translation).

* cited by examiner

*Primary Examiner* — Carlos Amaya
(74) *Attorney, Agent, or Firm* — NSIP Law

(57) ABSTRACT

A wireless power transceiver that is disposed between a source resonator and a target resonator and that may increase wireless power transmission efficiency is provided. The wireless power transceiver may include a power receiver that includes a receiving resonator that receives an inbound power from a source resonator, a power transmitter that includes a transmitting resonator that transmits an outbound power to a target resonator, and a coupling controller to control a coupling frequency between the target resonator and the transmitting resonator.

29 Claims, 22 Drawing Sheets

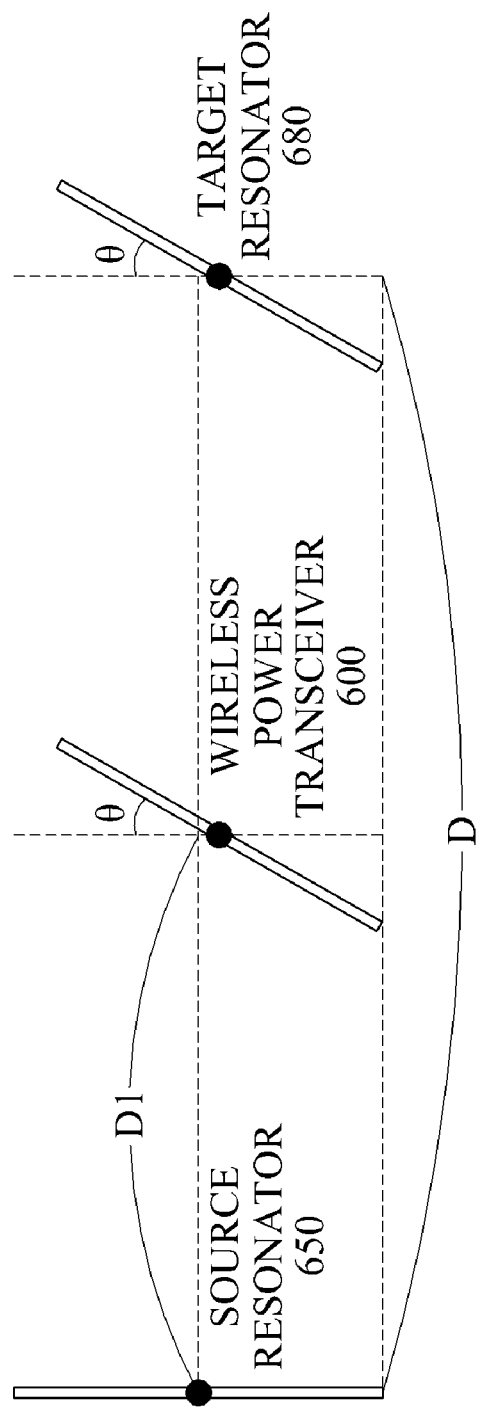

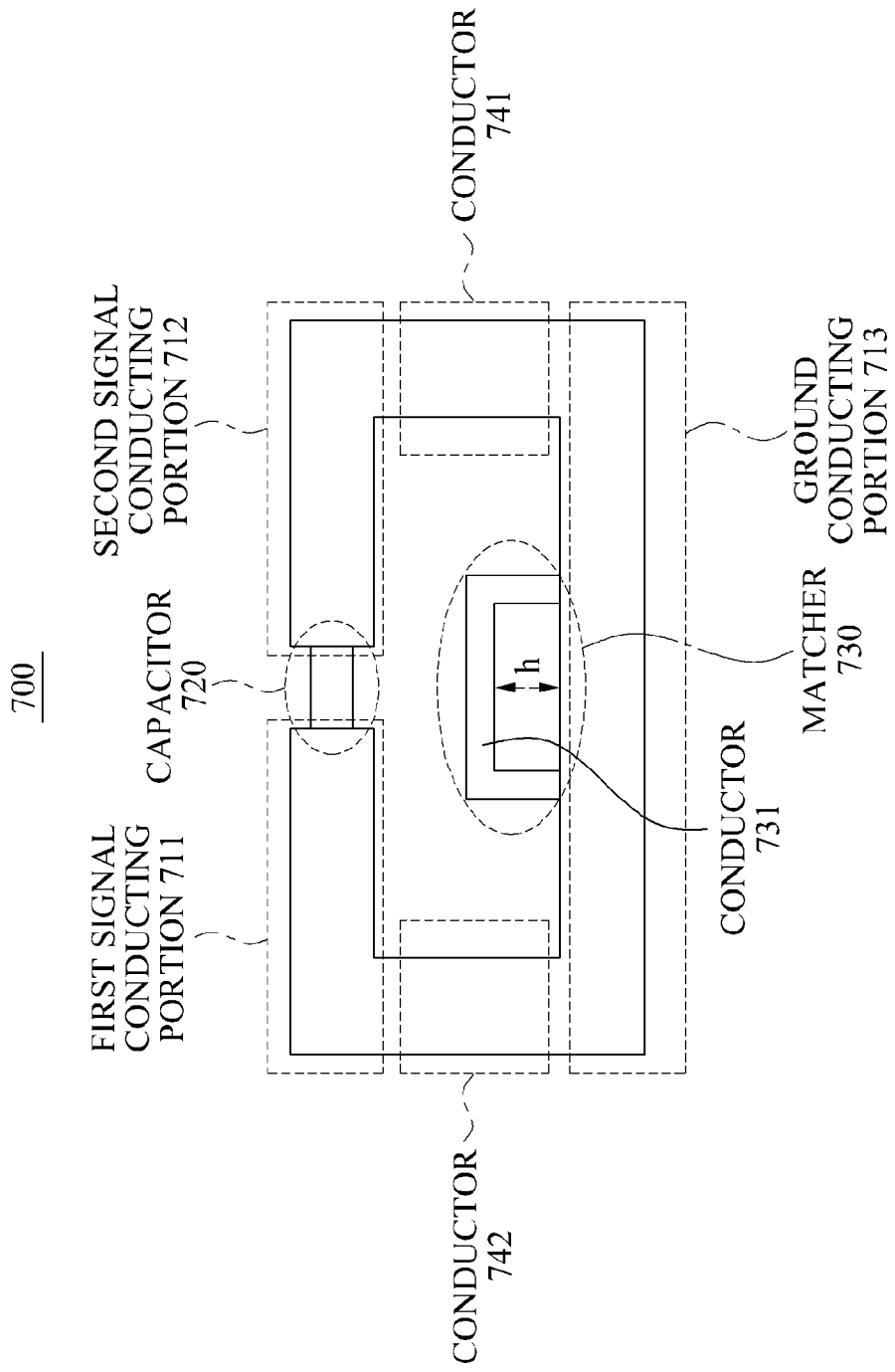

WIRELESS POWER TRANSCEIVER AND WIRELESS POWER SYSTEM

CROSS-REFERENCE TO RELATED APPLICATION(S)

This application claims the benefit under 35 U.S.C. §119 (a) of Korean Patent Application No. 10-2009-0116387, filed on Nov. 30, 2009, and Korean Patent Application No. 10-2010-0104370, filed on Oct. 26, 2010, in the Korean Intellectual Property Office, the entire disclosures of which are both incorporated herein by reference for all purposes.

BACKGROUND

1. Field

The following description relates to a wireless power transceiver and a wireless power system, and more particularly, to a wireless power transceiver that may be disposed between a source resonator and a target resonator and that may improve wireless power transmission efficiency of a wireless power system.

2. Description of Related Art

With the development of Information Technology (IT), a variety of portable electronic devices and the amount of portable electronic devices have increased. One important aspect under consideration with portable electronic devices is the battery performance of the respective devices.

In addition to portable electronic devices, home electronic appliances have that can transmit data wirelessly and that can be supplied with power over a power line have been developed.

Currently, researches are being conducted on wireless power transmission technologies that may wirelessly supply power to appliances and portable electronic devices. Based on characteristics of a wireless environment, as the distance between a source resonator and a target resonator increases, the power transmission efficiency between a source resonator and a target resonator may degrade.

SUMMARY

In one general aspect, there is provided a wireless power transceiver, comprising a power receiver comprising a receiving resonator that receives an inbound power from a source resonator, a power transmitter comprising a transmitting resonator that transmits an outbound power to a target resonator, and a coupling controller to control a coupling frequency between the target resonator and the transmitting resonator.

The wireless power transceiver may further comprise an isolator to electrically isolate the power receiver and the power transmitter.

The coupling controller may control a frequency such that a reflected wave of a transmission signal transmitted from the transmitting resonator to the target resonator has a minimum amplitude, and may set the controlled frequency as the coupling frequency.

The coupling controller may control a frequency such that a reflected wave of a transmission signal transmitted from the transmitting resonator to the target resonator is in phase with the transmission signal, and may set the controlled frequency as the coupling frequency.

The coupling controller may control a frequency such that a reflected wave of a transmission signal transmitted from the transmitting resonator to the target resonator has a minimum power, and may set the controlled frequency as the coupling frequency.

The coupling controller may comprise a power detector to measure a power of the reflected wave.

The power transmitter may further comprise a power distribution circuit to control a magnitude of the outbound power.

The power transmitter may further comprise a directivity controller to control a direction of the outbound power.

The coupling controller may comprise a Phase Locked Loop (PLL) circuit to control the coupling frequency.

The wireless power transceiver may further comprise a load to adjust an inbound power transmission distance and an outbound power transmission distance.

At least one of the source resonator, the target resonator, the receiving resonator, and the transmitting resonator may comprise a transmission line comprising a first signal conducting portion, a second signal conducting portion, and a ground conducting portion, and the ground conducting portion corresponds to the first signal conducting portion and the second signal conducting portion, a first conductor to electrically connect the first signal conducting portion and the ground conducting portion, a second conductor to electrically connect the second signal conducting portion and the ground conducting portion, and at least one capacitor inserted between the first signal conducting portion and the second signal conducting portion, and the at least one capacitor is positioned in series with respect to a current flowing between the first signal conducting portion and the second signal conducting portion.

The transmission line, the first conductor, and the second conductor may form a loop structure.

The transmission line, the first conductor, and the second conductor may form a rectangular loop structure.

The wireless power transceiver may further comprise a matcher to determine an impedance of a wireless power resonator, and the matcher may be positioned integrally within a loop formed by the transmission line, the first conductor, and the second conductor.

The matcher may have a rectangular shape.

The matcher may change a physical shape of the matcher, based on a control signal generated by a controller, in order to adjust the impedance of the wireless power resonator.

The controller may generate the control signal based on a state of an opposite resonator that receives or transmits power from or to the wireless power resonator.

The controller may generate the control signal based on at least one of a distance between the wireless power resonator and a wireless power resonator of a wireless power receiver, a reflection coefficient of a wave transmitted from the wireless power resonator to the wireless power resonator of the wireless power receiver, a power transmission gain between the wireless power resonator and the wireless power resonator of the wireless power receiver, and a coupling efficiency between the wireless power resonator and the wireless power resonator of the wireless power receiver.

The matcher may comprise a conductor for the impedance matching in a location separated from the ground conducting portion by a predetermined distance, and the conductor may be formed integrally with the ground conducting portion, and the impedance of the wireless power resonator may be adjusted based on the distance between the ground conducting portion and the conductor for the impedance matching.

The matcher may comprise at least one active element to adjust the impedance of the wireless power resonator based on a control signal generated by a controller.

The at least one capacitor may be inserted as a lumped element between the first signal conducting portion and the second signal conducting portion.

The at least one capacitor may be configured as a distributed element and may have a zigzagged structure.

The capacitance of the at least one capacitor may be set based on at least one of a criterion for enabling the wireless power resonator to have a characteristic of the metamaterial, a criterion for enabling the wireless power resonator to have a negative magnetic permeability in a target frequency, and a criterion for enabling the wireless power resonator to have a zeroth order resonance characteristic in the target frequency.

The plurality of conductor lines may be disposed in parallel on a surface of the first signal conducting portion and on a surface of the second signal conducting portion, and may be shorted to each other at an end portion of each of the first signal conducting portion and the second signal conducting portion.

The first signal conducting portion and the ground conducting portion may be seamlessly connected to each other, and the second signal conducting portion and the ground conducting portion may be seamlessly connected to each other.

At least one of the first signal conducting portion, the second signal conducting portion, and the ground conducting portion may comprise a hollow space inside.

The wireless power transceiver may further comprise a magnetic core that passes through a space between the first signal conducting portion, the second signal conducting portion, and the ground conducting portion.

The wireless power resonator may comprise at least two transmission lines, the at least two transmission lines may be connected in series, in parallel, or in a spiral form, and at least one capacitor may be inserted between a first signal conducting portion and a second signal conducting portion that are comprised in each of the at least two transmission lines.

In another aspect, there is provided a wireless power system, comprising at least one source resonator, at least one target resonator, and a wireless power transceiver to receive an inbound power from the at least one source resonator, to transmit an outbound power to the at least one target resonator, and to control a coupling frequency between the at least one source resonator and the at least one target resonator.

Other features and aspects may be apparent from the following description, the drawings, and the claims.

BRIEF DESCRIPTION OF THE DRAWINGS

FIG. 6C is a diagram illustrating another example of controlling the direction at which power is transmitted by a wireless power transceiver.

FIG. 7 is a diagram illustrating an example of a resonator that has a two-dimensional (2D) structure.

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, description of well-known functions and constructions may be omitted for increased clarity and conciseness.

Figure 1A:
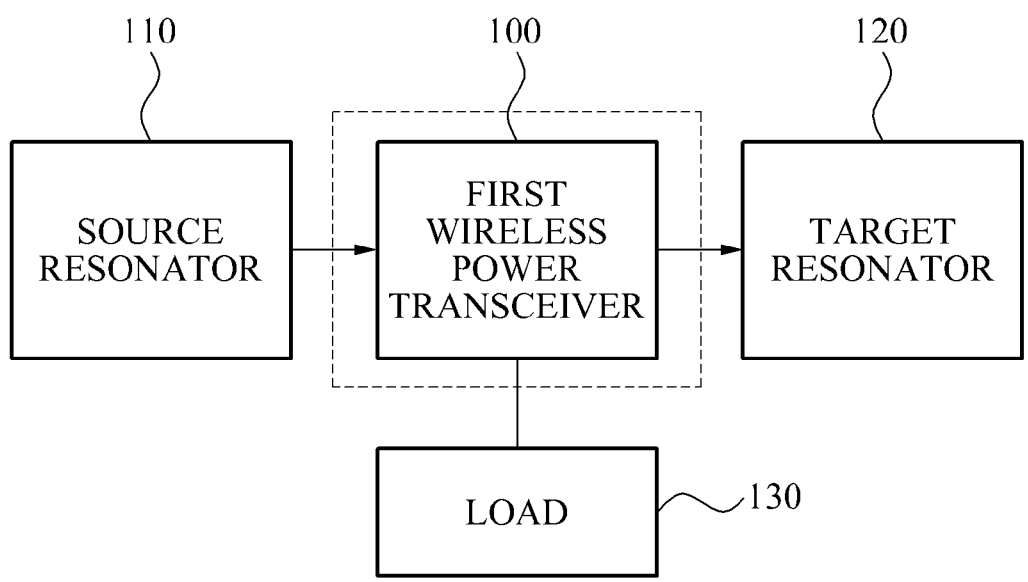
FIGS. 1A and 1B are diagrams illustrating examples of wireless power systems.
Figure 1B:
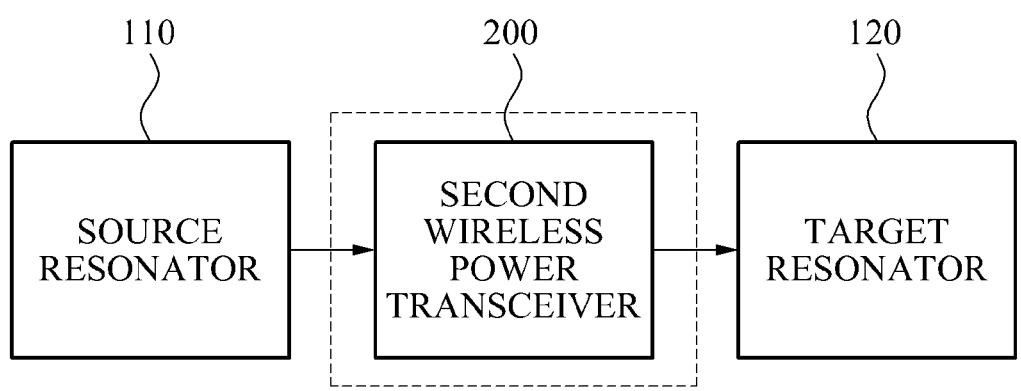

FIGS. 1A and 1B illustrate examples of wireless power systems. FIG. 1A includes a wireless power system that includes a first wireless power transceiver 100. FIG. 1B includes a wireless power system that includes a second wireless power transceiver 200. The wireless power transceiver described in FIGS. 1A and/or 1B may be or may be included in a terminal such as a mobile terminal, a desktop computer, a laptop computer, personal digital assistant (PDA), a MP3 player, and the like.

Referring to FIG. 1A, the first wireless power transceiver 100 is disposed between a source resonator 110 and a target resonator 120. Referring to FIG. 1B, the second wireless power transceiver 200 is also disposed between a source resonator 110 and a target resonator 120. Each of the first wireless power transceiver 100 and the second wireless power transceiver 200 may receive power transmitted wirelessly from the source resonator 110, and may transmit the received power to the target resonator 120.

As an example, the wireless power transceivers (100 and 200) may be disposed at a location between the source resonator 110 and the target resonator 120. For example, the first wireless power transceiver 100 and the second wireless power transceiver 200 may be installed in optimal locations between the source resonator 110 and the target resonator 120 such that a transmission efficiency of power transmitted from the source resonator 110 to the target resonator 120 is increased.

The first wireless power transceiver 100 of FIG. 1A may control a transmission efficiency or a transmission distance of wireless power transmitted from the source resonator 110 by adjusting a load 130 connected to first wireless power transceiver 100. For example, the load 130 may be connected via a wired or wireless connector (not shown) to the first wireless power transceiver 100.

The second wireless power transceiver 200 of FIG. 1B may control a transmission efficiency or a transmission distance of wireless power transmitted from the source resonator 110, without using the load 130.

The first wireless power transceiver 100 and the second wireless power transceiver 200 of FIGS. 1A and 1B may be applied using various schemes.

As shown in FIGS. 1A and 1B, each of the first wireless power transceiver 100 and the second wireless power transceiver 200 may be disposed between the source resonator 110 and the target resonator 120. In these examples, the wireless power transmission efficiency between the source resonator 110 and the target resonator 120 may be raised, and the distance that the wireless power is transmitted from the source resonator 110 may also be increased. The wireless power may be transmitted to at least one device, for example, the target resonator 120, based on locations and/or sizes of the first wireless power transceiver 100 and the second wireless power transceiver 200, respectively. Additionally, the amount of power transmission wirelessly transmitted may be based on the locations and the sizes of the first wireless power transceiver 100 and the second wireless power transceiver 200, a number of first wireless power transceivers 100, a number of second wireless power transceivers 200, a combination thereof, and the like.

A coupling coefficient between resonators may be inversely proportional to the cube of distance between the resonators, and at the same time may be proportional to a wireless power transmission efficiency. In other words, because each of the first wireless power transceiver 100 and the second wireless power transceiver 200 are disposed between the source resonator 110 and the target resonator 120, the transmission efficiency of the power transmitted from the source resonator 110 to the target resonator 120 may be increased.

For example, when the first wireless power transceiver 100 is inserted between the source resonator 110 and the target resonator 120, a coupling coefficient between the source resonator 110 and the first wireless power transceiver 100, and a coupling coefficient between the target resonator 120 and the first wireless power transceiver 100, may be increased. Accordingly, it is possible to obtain a greater transmission efficiency than when the first wireless power transceiver 100 is not included. For example, a resonance frequency of a resonator (not shown) of the first wireless power transceiver 100 may be equal to a resonance frequency of the source resonator 110 and a resonance frequency of the target resonator 120.

Figure 2A:
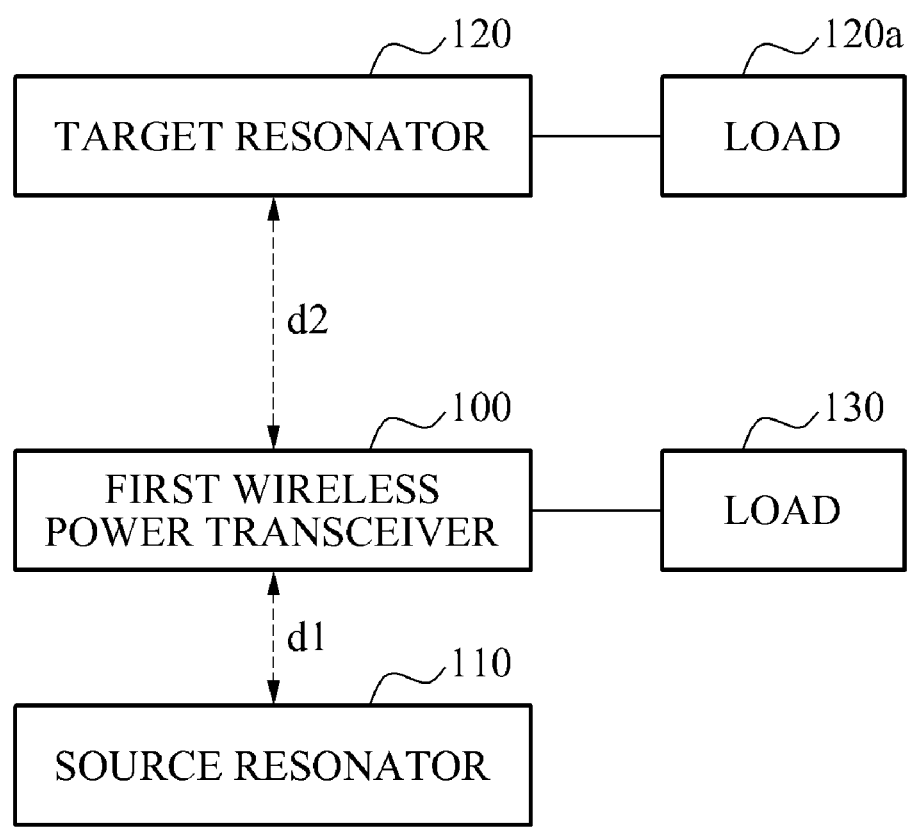
FIGS. 2A and 2B are diagrams illustrating examples of wireless power transmission efficiency based on the location of a wireless power transceiver.
Figure 2B:
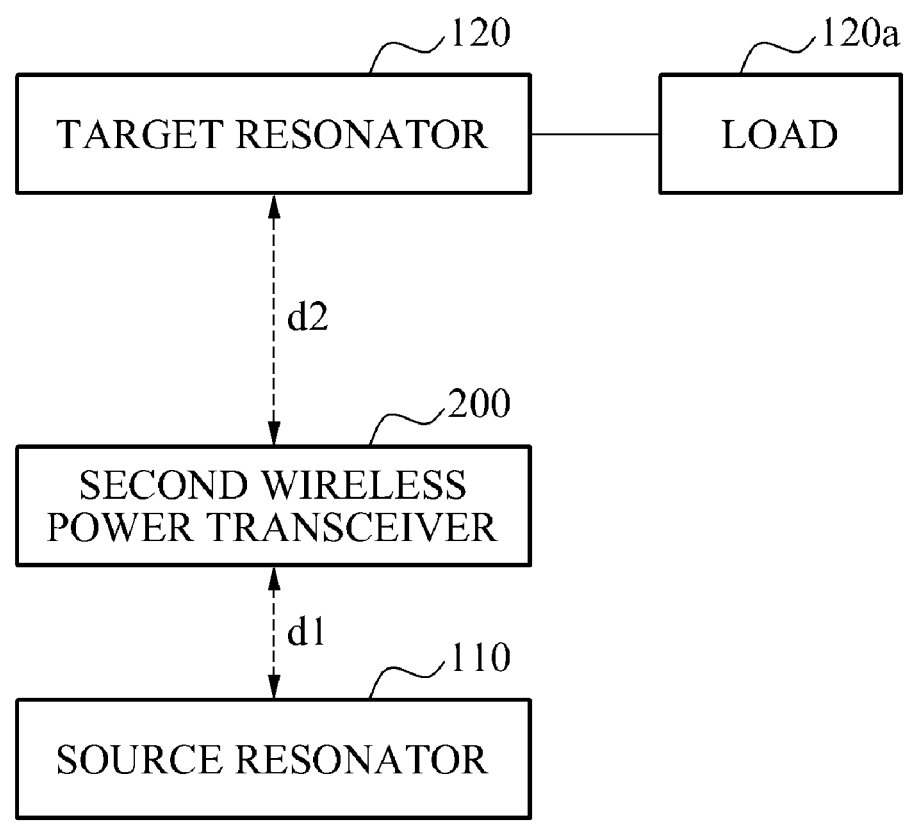

FIGS. 2A and 2B illustrate examples of a wireless power transmission efficiency based on the location of a wireless power transceiver.

Referring to FIG. 2A, a distance d1 between the source resonator 110 and the first wireless power transceiver 100, and a distance d2 between the target resonator 120 and the first wireless power transceiver 100, may be changed based on the location of the first wireless power transceiver 100. Referring to FIG. 2B, a distance d1 between the source resonator 110 and the second wireless power transceiver 200, and a distance d2 between the target resonator 120 and the second wireless power transceiver 200, may be changed based on the location of the second wireless power transceiver 200.

In FIG. 2A, for example, the location of the first wireless power transceiver 100 may affect an amount of power wirelessly transmitted to the target resonator 120 or a load 120a of the target resonator 120, and an amount of power wirelessly transmitted to the load 130. In FIG. 2B, for example, the location of the second wireless power transceiver 200 may affect an amount of power wirelessly transmitted to the target resonator 120. Accordingly, a coupling coefficient and an amount of wireless power transmitted may be controlled by adjusting the locations of the first wireless power transceiver 100 and second wireless power transceiver 200, in their respective examples, and the wireless power may be distributed and transmitted. For example, in FIG. 2A, an amount of power wirelessly transmitted to the target resonator 120 may increase, as the distance d2 between the target resonator 120 and the first wireless power transceiver 100 decreases. The first wireless power transceiver 100 may distribute the wireless power such that the amount of power wirelessly transmitted to the load 130 may be reduced.

Figure 3A:
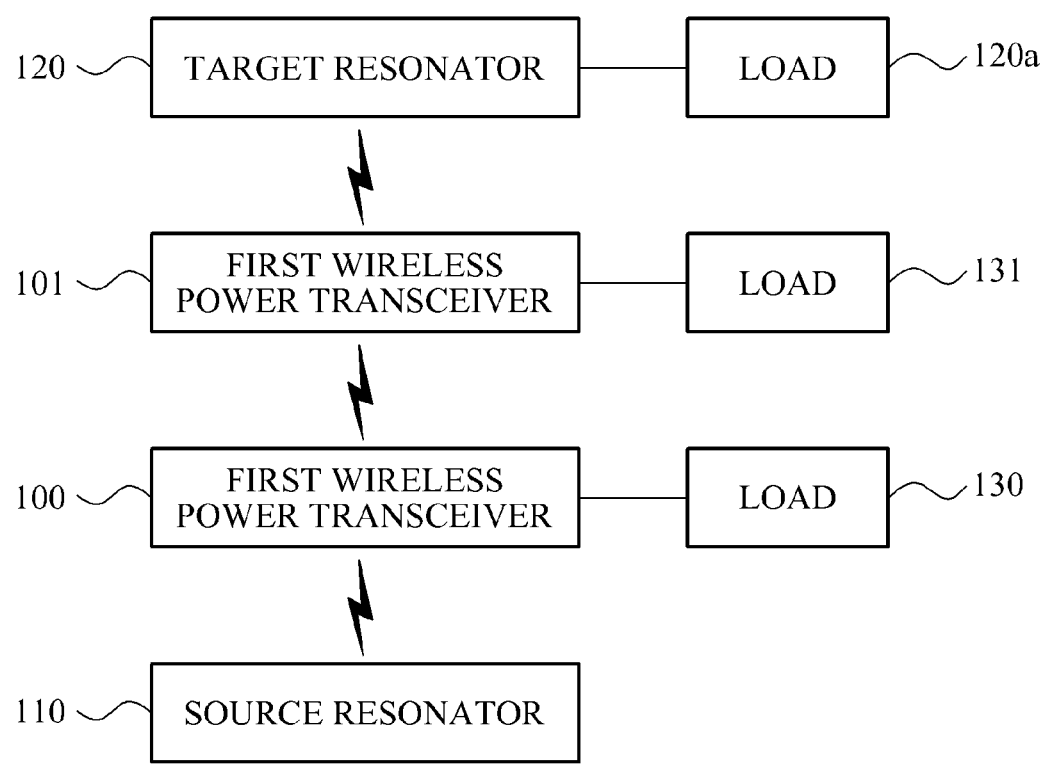
FIGS. 3A and 3B are diagrams illustrating examples of a wireless power transmission efficiency and a transmission distance based on the number of wireless power transceivers.
Figure 3B:
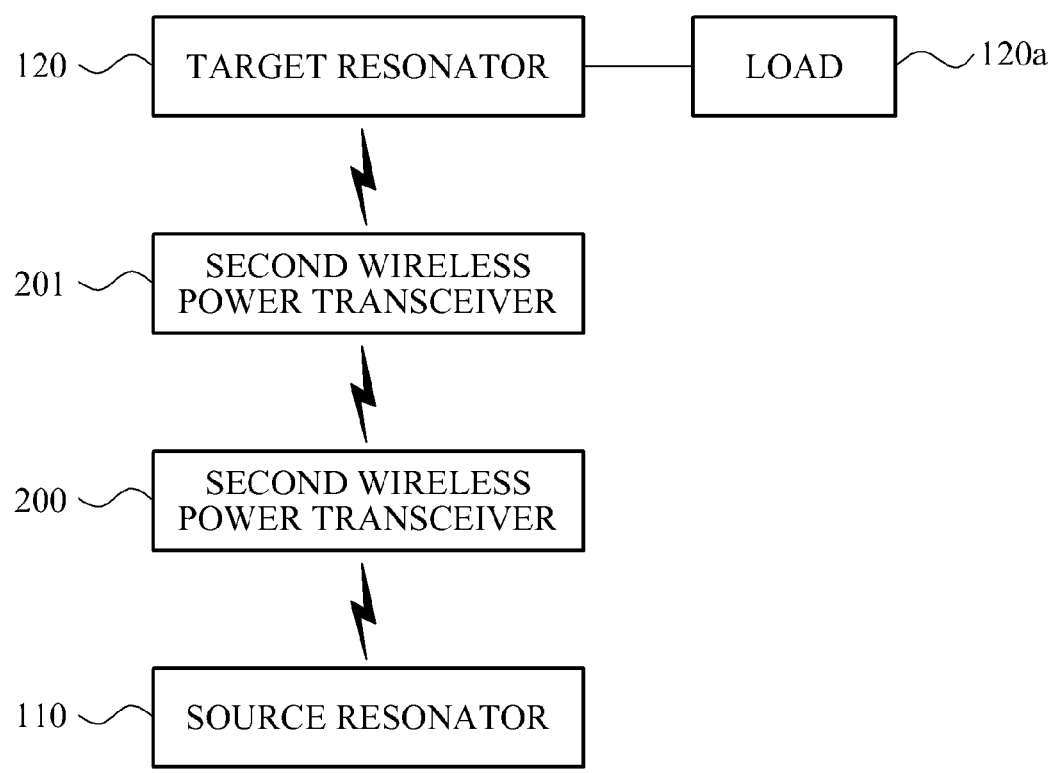

FIGS. 3A and 3B illustrate examples of a wireless power transmission efficiency and a transmission distance based on the number of wireless power transceivers.

While only a single wireless power transceiver, such as the first wireless power transceiver 100 or the second wireless power transceiver 200, is disposed between the source resonator 110 and the target resonator 120 as shown in FIGS. 1A and 1B, it should be appreciated that more than one wireless power transceiver may be disposed between the source resonator 110 and the target resonator 120. The number of wireless power transceivers disposed between a source resonator and target resonator 120, and/or a number of second wireless power transceivers disposed between the source resonator 110 and the target resonator 120 may affect wireless power transmission efficiency. Additionally, the first wireless power transceiver 100 and second wireless power transceiver may adjust a value of the load 130 such that power may be effectively distributed.

In FIG. 3A, two first wireless power transceivers 100 and 101 are disposed between the source resonator 110 and the target resonator 120. In FIG. 3B, two second wireless power transceivers 200 and 201 are disposed between the source resonator 110 and the target resonator 120.

Referring to FIG. 3A, the two first wireless power transceivers 100 and 101 may adjust matching conditions of their respective loads 130 and 131, in order to more efficiently distribute power.

For example, a transmission efficiency of a wireless power transmitted from the source resonator 110 to the first wireless power transceiver 100 may be A %, a transmission efficiency of a wireless power transmitted from the first wireless power transceiver 100 to the first wireless power transceiver 101 may be B %, and a transmission efficiency of a wireless power transmitted from the first wireless power transceiver 101 to the target resonator 120 may be C %. For example, A % may be similar to the sum of B % and C %. The total wireless power transmission efficiency may remain substantially unchanged, even when a port impedance of the first wireless power transceiver 100 and the second wireless power transceiver 200 is changed. For example, in view of an input wireless power and a consumed wireless power, the total wireless power transmission efficiency may be A %.

Referring to FIG. 3B, the two second wireless power transceivers 200 and 201 are not connected to a load. In this example, the second wireless power transceivers 200 and 201 may adjust a matching condition of each resonator in order to more efficiently distribute power. Each of the second wireless power transceivers 200 and 201 may include at least one resonator. Accordingly, it is possible to adjust a transmission efficiency and power distribution based on the number (or amount) of second wireless power transceivers, even when the second wireless power transceivers 200 and 201 are not connected to a load.

In the examples of FIGS. 3A and 3B the number of wireless power transceivers between the source resonator and the target resonator is two. However, it should be appreciated that the number of wireless power transceivers is not limited to two. For example, the number of wireless power transceivers between the source resonator and the target resonator may be one or more wireless power transceivers, for example, one transceiver, two transceivers, three transceivers, or more.

Figure 4A:
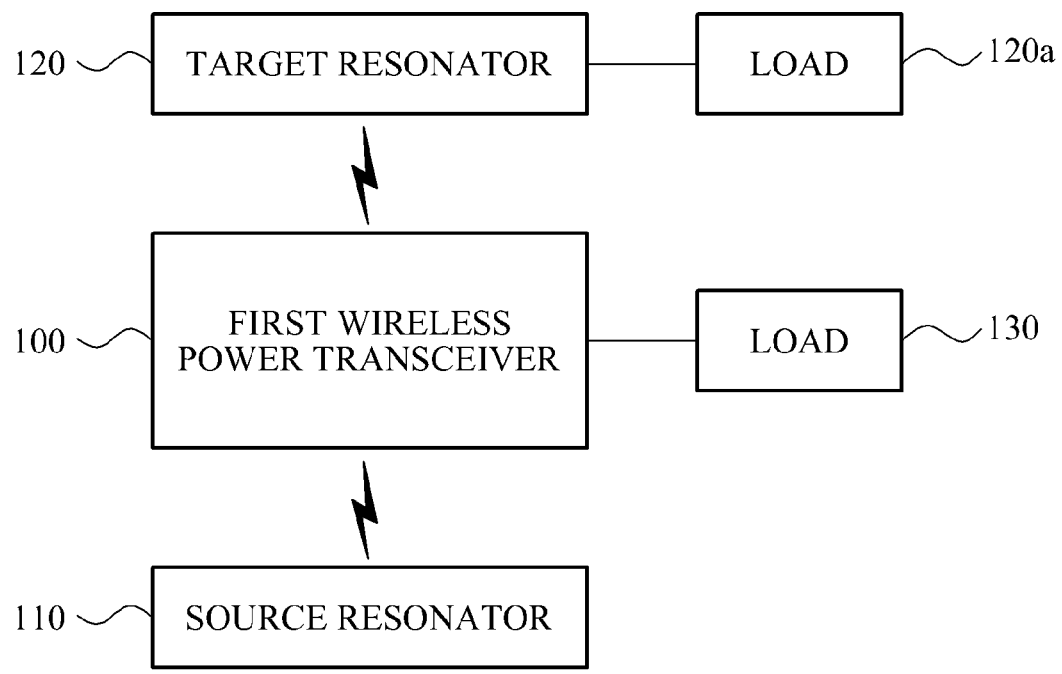
FIGS. 4A and 4B are diagrams illustrating examples of a wireless power transmission distance based on the size of a wireless power transceiver.
Figure 4B:
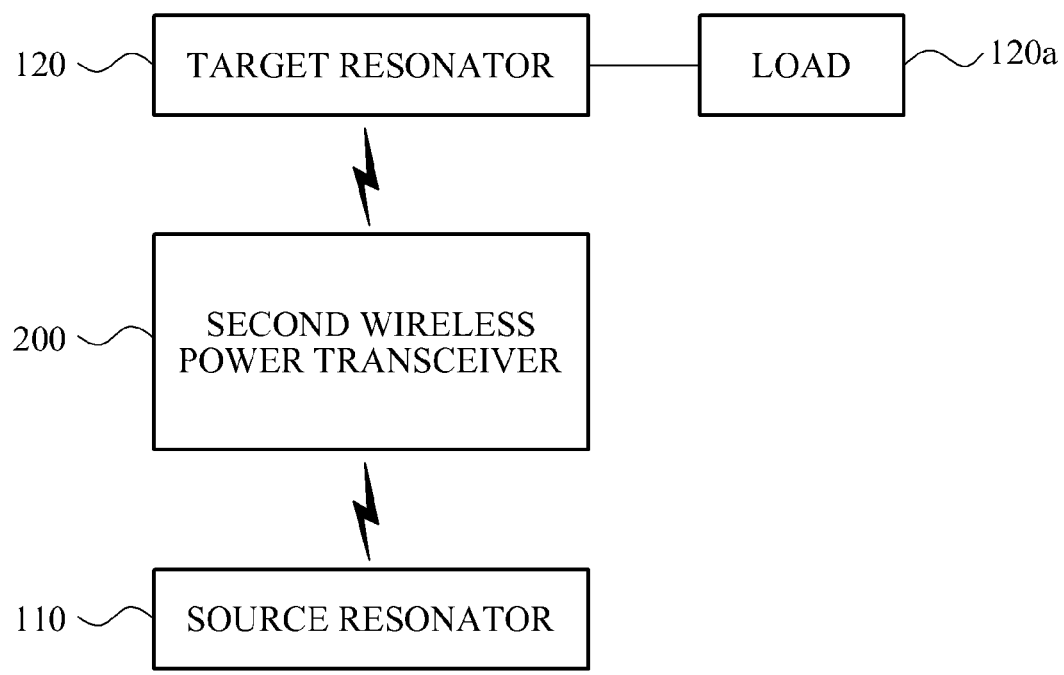

FIGS. 4A and 4B illustrate examples of a wireless power transmission distance based on the size of a wireless power transceiver.

As shown in FIGS. 4A and 4B, when the first wireless power transceiver 100 and the second wireless power transceiver 200 are increased in physical size, a transmission efficiency and a transmission distance may be increased. For example, even when a size of a resonator included in the first wireless power transceiver 100 is less than a size of the source resonator 110, a coupling coefficient may be increased. Accordingly, the total transmission efficiency may also be increased. As another example, when the size of the resonator included in the first wireless power transceiver 100 becomes greater than the size of the source resonator 110, a transmission efficiency and a transmission distance for a wireless power may be increased.

For example, to improve the transmission efficiency when a wireless power is being transmitted to a plurality of devices, it may be more efficient to increase a number of first and second wireless power transceivers 100 and 200. As another example, to transmit a wireless power with a high efficiency while maintaining a long transmission distance of the wireless power, it may be more efficient to increase the size of first and second wireless power transceivers 100 and 200. As another example, it may be more efficient to increase both the number of wireless power transceivers and the size of the wireless power transceivers.

The first wireless power transceiver 100 may enable power to be efficiently distributed by controlling a matching condition for the load 130 of FIG. 1A. For example, when a plurality of target resonators 120 exist, the first wireless power transceiver 100 may efficiently transfer power consumed by a load (not shown) connected to each of the plurality of target resonators 120, by controlling a matching condition among the source resonator 110, the first wireless power transceiver 100, and the target resonators 120. For example, the matching condition may be controlled by adjusting a port impedance value of each of the source resonator 110, the first wireless power transceiver 100, and the target resonators 120.

For example, impedance matching may be determined by a mutual inductance between the source resonator 110 and the target resonator 120. As another example, a value of the mutual inductance may be determined based on a distance between the source resonator 110 and the target resonator 120, a size of the source resonator 110, and a size of the target resonator 120. For example, when a wireless power transceiver including at least one resonator (not shown) (for example, the first wireless power transceiver 100 or the second wireless power transceiver 200) is installed between the source resonator 110 and the target resonator 120, the value of the mutual inductance may be changed due to an insertion of the at least one resonator (not shown).

Accordingly, the impedances may be changed. For example, matching the changed impedances may enable the transmission efficiency to be increased, and power to be more efficiently distributed. For example, at least one of a location, a distance, a direction, and a size of at least one resonator (not shown), the amount of resonators, and the like may be adjusted, and the mutual inductance and the impedances may be controlled. Thus, it is possible to determine the transmission efficiency and power distribution.

Figure 5A:
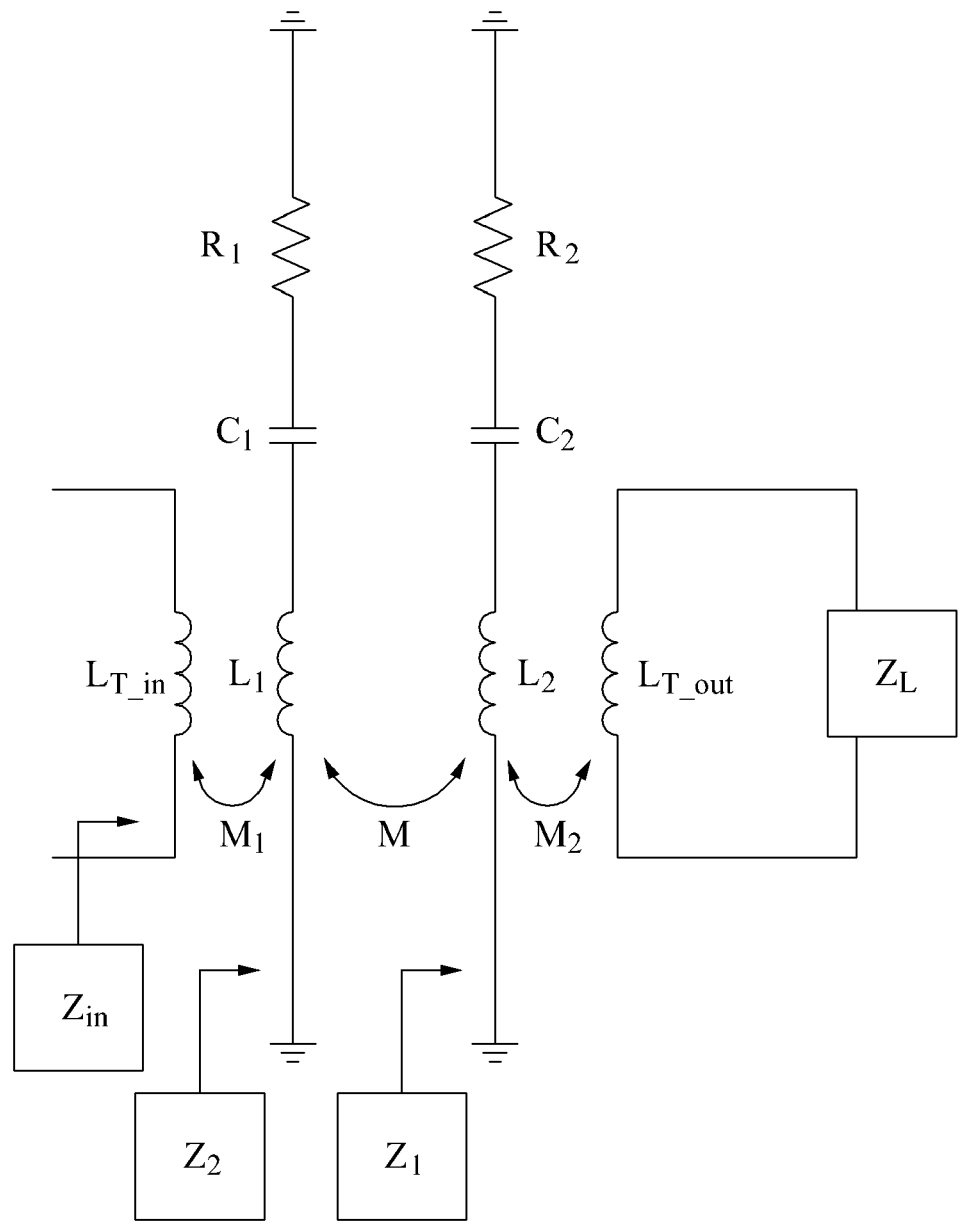
FIG. 5A is a diagram illustrating an example of a resonator coupling equivalent circuit in which two resonators are inserted.

FIG. 5A illustrates an example of a resonance coupling equivalent circuit in which two resonators are inserted.

Equation 1 may be used to compute an impedance of an equivalent circuit that is changed based on an insertion or removal of resonators.

$$Z_{in} = \frac{R_2 + R_1(\omega M_1)^2 \pm \sqrt{(R_2 + R_1(\omega M_1)^2)^2 - 4(\omega M_2)^2(\omega M_1)^2\{(\omega M)^2 + R_1 R_2\}}}{2\{(\omega M)^2 + R_1 R_2\}}$$ [Equation 1]

Referring to FIG. 5A and Equation 1, $Z_{in}$ denotes an impedance, $R_1$ and $R_2$ denote resistances, and $M_1$ and $M_2$ denote mutual inductances. For example, the mutual inductances may be influenced by the number of resonators in a wireless power transceiver, a location of a resonator, a size of a resonator, and the like. Accordingly, a transmission efficiency and a power distribution may be determined through matching of changed impedances based on $Z_{in}$, $R_1$, $R_2$, $M_1$ and $M_2$.

Figure 5B:
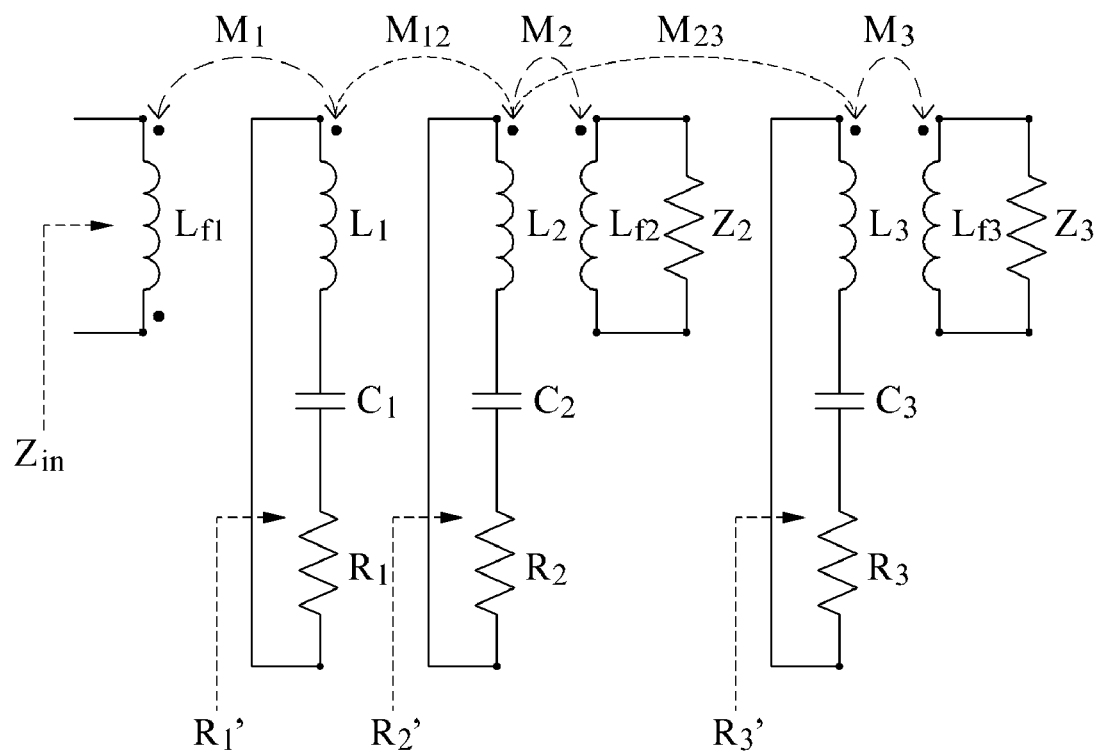
FIG. 5B is a diagram illustrating an example of a resonator coupling equivalent circuit in which two target resonators exist and three resonators are inserted.

FIG. 5B illustrates an example of a resonance coupling equivalent circuit in which two target resonators exist and three resonators are inserted.

Equation 2 may be used to compute an impedance of an equivalent circuit that is changed based on an insertion or removal of resonators.

$$R'_3 = \frac{(\omega M_3)^2}{Z_3} + R_3$$ [Equation 2]

$$R'_2 = \frac{(\omega M_{23})^2}{R'_3} + \frac{(\omega M_2)^2}{Z_2} + R_2$$

$$R'_1 = \frac{(\omega M_{12})^2}{R'_2} + R_1$$

$$Z_{in} = \frac{(\omega M_1)^2}{R'_1} = \frac{(\omega M_1)^2}{R_1 + \dfrac{(\omega M_{12})^2}{R_2 + \omega^2\left(\dfrac{M_2^2}{Z_2} + \dfrac{M_{23}^2 Z_3}{(\omega M_3)^2 + R_3 Z_3}\right)}}$$

Referring to FIG. 5B and Equation 2, $Z_{in}$ denotes an impedance, $R_1$, $R_2$, $R_3$, $R_1'$, $R_2'$, and $R_3'$ denote resistances, $M_1$, $M_2$, $M_3$, $M_{12}$, and $M_{23}$ denote mutual inductances, and $Z_2$ and $Z_3$ denote loads. For example, the mutual inductances may be influenced by the number of resonators included in a wireless power transceiver, a location of a resonator, a size of a resonator, and the like. Accordingly, a transmission efficiency and a power distribution may be determined through matching of changed impedances based on $Z_{in}$, $R_1$, $R_2$, $R_3$, $R_1'$, $R_2'$, $R_3'$, $M_1$, $M_2$, $M_3$, $M_{12}$, $M_{23}$, $Z_2$, and $Z_3$.

Figure 6A:
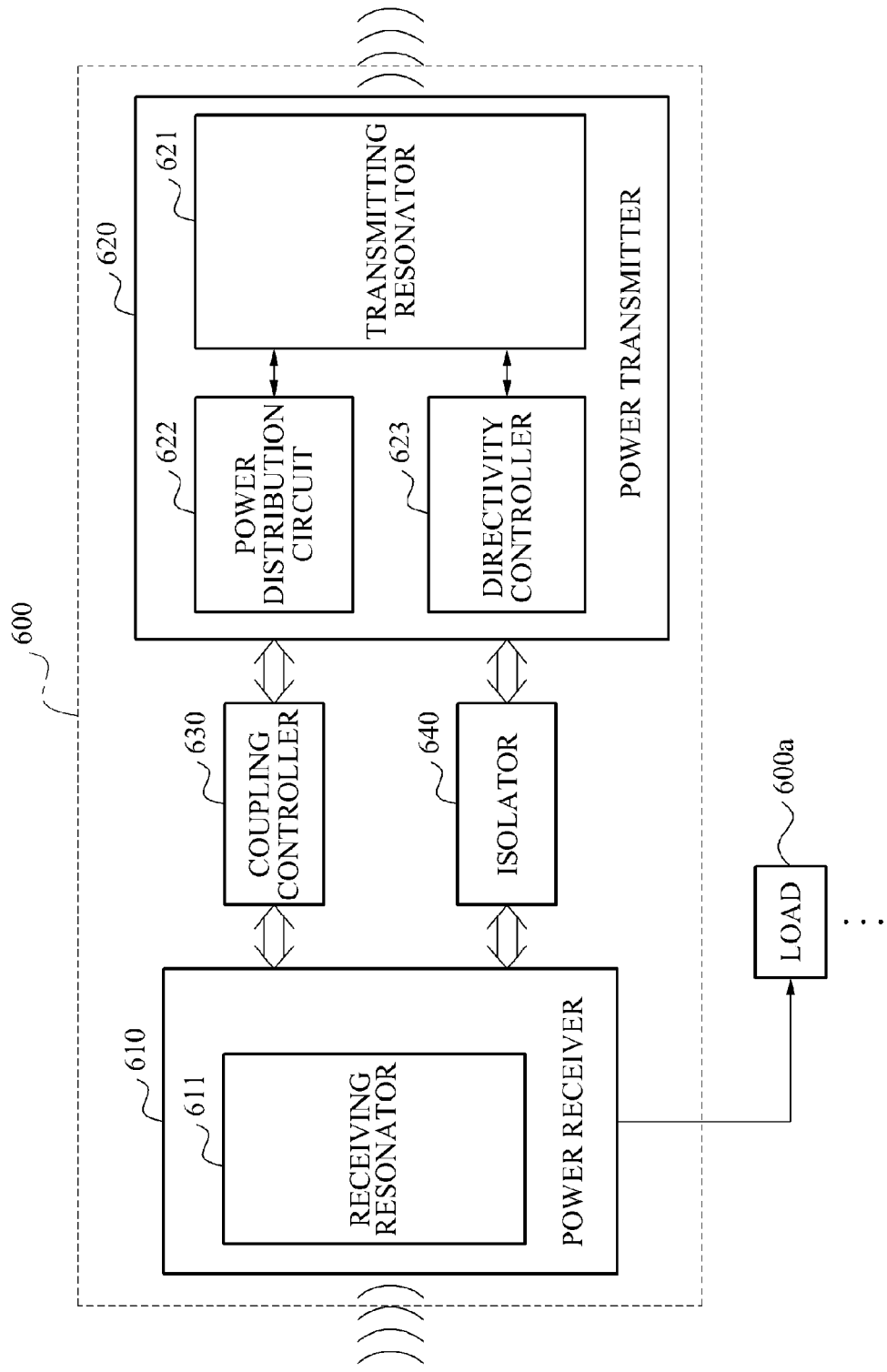
FIG. 6A is a diagram illustrating an example of a wireless power transceiver.

FIG. 6A illustrates an example of a wireless power transceiver.

For example, the wireless power transceiver 600 of FIG. 6A may be implemented as the first wireless power transceiver 100 (shown in FIG. 1) connected to the load 130. Referring to FIG. 6A, the wireless power transceiver 600 includes a power receiver 610, a power transmitter 620, and a coupling controller 630. The wireless power transceiver 600 may be connected to a load, for example, load 600a. When the load 600a is not connected to the wireless power transceiver 600, the wireless power transceiver 600 may be implemented as the second wireless power transceiver 200 (shown in FIG. 2).

In this example, the power receiver 610 includes a receiving resonator 611 that may be matched to a source resonator or another wireless power transceiver and that may receive an inbound power from either the source resonator or another wireless power transceiver.

In this example, the power transmitter 620 includes a transmitting resonator 621 that may transmit an outbound power to a target resonator or another wireless power transceiver using the inbound power received from the power receiver 610. The power transmitter 620 may further include a power distribution circuit 622 and a directivity controller 623. The power distribution circuit 622 may control a magnitude of outbound power transmitted from the power transmitter, and the directivity controller 623 may control a direction of the transmitted outbound power.

In this example, the receiving resonator 611 in the power receiver 610 is functionally distinguished from the transmitting resonator 621 in the power transmitter 620. However, it should be appreciated that the receiving resonator 611 and the transmitting resonator 621 may be physically implemented as a single resonator. Additionally, the receiving resonator 611 and the transmitting resonator 621 are individually provided for each function as shown in FIG. 6A, however, the wireless power transceiver 600 may include at least two or more resonators to receive power from a plurality of source resonators and/or to transmit power to a plurality of target resonators. That is, FIG. 6A is an example of the wireless power transceiver 600 and accordingly, it should be understood that various modifications may be made by applying the wireless power transceiver 600.

The coupling controller 630 may control a coupling frequency between a target resonator and the transmitting resonator 621, or between another wireless power transceiver and the transmitter resonator 621. For example, the coupling controller 630 may include a phase locked loop (PLL) circuit (not shown) to control the coupling frequency. Additionally, the coupling controller 630 may control a transmission frequency of a wireless power transmitted via the transmitting resonator 621 to a target resonator or another wireless power transceiver, using the PLL circuit.

For example, the coupling controller 630 may control the coupling frequency using the various schemes described herein.

For example, in a first scheme, when a transmission signal is transmitted from a source resonator or another wireless power transceiver to the receiving resonator 611, a part of the transmission signal may be reflected and returned to the source resonator or the wireless transceiver. The portion of the transmission signal that reflects is referred to as a reflected wave. The coupling controller 630 of the wireless power transceiver 600 may measure an amplitude of the reflected wave. Based on the measured amplitude, the coupling controller 630 may control and/or adjust a frequency of the transmission signal in order to reduce the amplitude of the reflected wave, and set the adjusted frequency as the coupling frequency. For example, the coupling frequency may be adjusted such that the reflected wave has a minimum amplitude.

Under the control of the coupling controller 630, for example, the coupling frequency may be set to a frequency in which a maximum power transmission is measured, or a frequency in which the minimum amplitude of the reflected wave and the maximum power transmission are measured. In this example, the maximum power transmission may indicate that a maximum current value is measured. For example, the maximum power transmission may not refer to the maximum output power capable of being produced by the wireless power transceiver, but instead, may refer to the greatest achievable amount of power capable of being transmitted, while at the same time keeping the reflected wave at a minimum frequency.

As another example, information regarding a coupling frequency may be received from an external terminal that measures an amplitude of a reflected wave, and a corresponding coupling frequency may be set as a transmission frequency. As another example, the coupling controller 630 may be implemented to measure the amplitude of the reflected wave and to determine the coupling frequency.

For example, in a second scheme, the coupling controller 630 may control a frequency and set the coupling frequency as a frequency in which the reflected wave is in phase with the transmission signal. As another example, information regarding a coupling frequency may be received from an external terminal that measures an amplitude of a reflected wave, and a corresponding coupling frequency may be set as a transmission frequency. As another example, the coupling controller 630 may be implemented to measure the phase of the reflected wave and to determine the coupling frequency.

For example, in a third scheme, the coupling controller 630 may control a frequency and set the coupling frequency as a frequency in which the reflected wave has a minimum power, based on a result obtained by measuring the power of the reflected wave. As another example, information regarding a coupling frequency may be received from an external terminal that measures an amplitude of a reflected wave, and a corresponding coupling frequency may be set as a transmission frequency. As another example, the coupling controller 630 may be implemented to measure the power of the reflected wave and to determine the coupling frequency. In this example, the coupling controller 630 may further include a power detector (not shown) to measure the power of the reflected wave.

Accordingly, the coupling controller 630 may determine the coupling frequency between a target resonator and the transmitting resonator 621 or between another wireless power transceiver and the transmitting resonator 621, may set the determined coupling frequency as the transmission frequency of the transmission signal, and may control power to be wirelessly transmitted to the target resonator or the other wireless power transceiver, using the above-described schemes.

The power transmitter 620 may further include the power distribution circuit 622, and the directivity controller 623, as described above. The power distribution circuit 622 may be designed to distribute the power transmitted wirelessly through the transmitting resonator 621. For example, the directivity controller 623 may perform coupling between a source resonator and a target resonator, and may perform beamforming of a wireless power in a direction that the target resonator is located or in a direction that another wireless power transceiver is located such that power transmission efficiency may be increased. For example, the directivity controller 623 may control the transmission direction of the power by mechanically controlling a direction of the transmitting resonator 621.

Figure 6B:
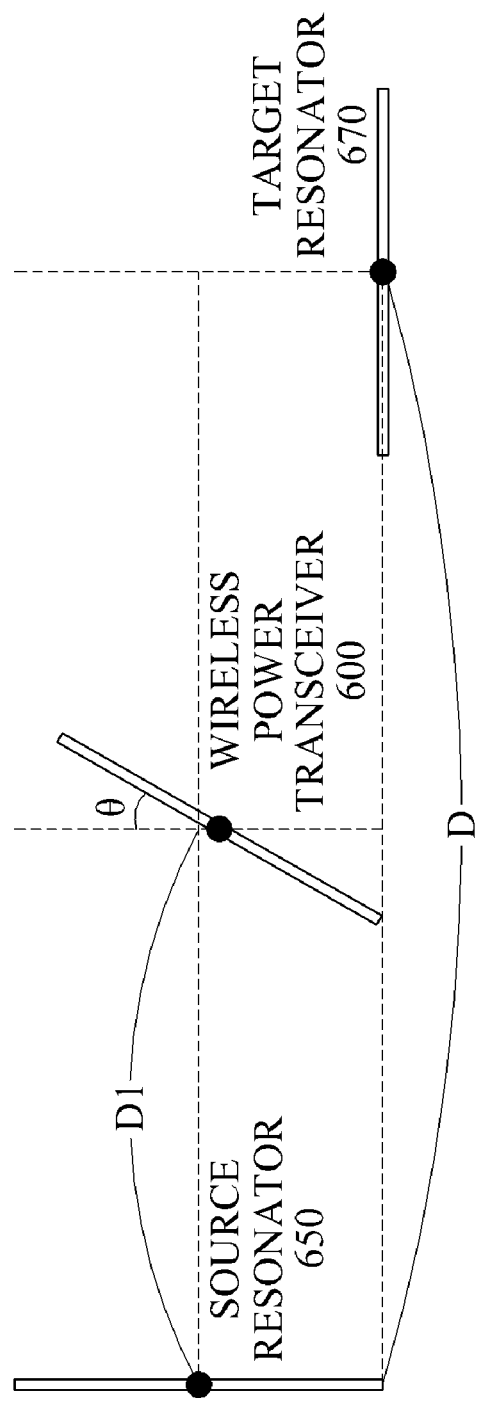
FIG. 6B is a diagram illustrating an example of controlling the direction at which power is transmitted by a wireless power transceiver.

FIG. 6B illustrates an example of controlling the direction at which power is transmitted by a wireless power transceiver.

Referring to FIG. 6B, the directivity controller 623 of the wireless power transceiver 600 may control the transmission direction of the transmitting resonator 621, based on, for example, a use, a location, a direction, a required power, a shape, and the like, of a target resonator 670. In FIG. 6B, a source resonator 650 may be approximately perpendicular to the target resonator 670. For example the directivity controller 623 may control a direction of the transmitting resonator 621 to be inclined by an angle θ, thereby increasing a transmission efficiency of a power transmitted to the target resonator 670. Additionally, the source resonator 650 may be spaced by a distance D1 from the wireless power transceiver 600, and may be spaced by a distance D from the target resonator 670. In the example of FIG. 6B, only one wireless power transceiver is illustrated, however, it should be appreciated that two or more wireless power transceivers may be included in a wireless power system.

FIG. 6C illustrates another example of controlling the direction at which power is transmitted by a wireless power transceiver.

Referring to FIG. 6C, a target resonator 680 may be inclined by an angle θ with respect to the source resonator 650. For example, the directivity controller 623 may control the direction of the transmitting resonator 621 to be inclined by an angle θ such that a direction of the transmitting resonator 621 may be aligned to be approximately parallel to a direction of the target resonator 680. Accordingly, the source resonator 650 may increase a transmission efficiency of a power transmitted via the wireless power transceiver 600 to the target resonator 680.

As another example, the transmission direction of the power may be controlled manually by a user. For example, a user may control the direction of the power by adjusting a location and an inclination of the wireless power transceiver 600.

Furthermore, the wireless power transceiver 600 may adjust, using the connected load 600a, a transmission distance and a transmission efficiency for at least one of the inbound power and the outbound power.

In some embodiments, the wireless power transceiver 600 may further include an isolator 640 to electrically isolate the power receiver 610 and the power transmitter 630, as shown in FIG. 6A. For example, the isolator 640 may electrically isolate the receiving resonator 611 for receiving the inbound power, and the transmitting resonator 621 for transmitting the outbound power, thereby reducing interference between the receiving resonator 611 and the transmitting resonator 621.

As described above, a wireless power transceiver may be applied using various schemes. The wireless power transceiver may receive power from a source resonator or from another wireless power transceiver, and may transmit the power to a target resonator or another wireless power transceiver. Accordingly, it is possible to widen a power transmission coverage of a source resonator, and it is also possible to raise a wireless power transmission efficiency between a source resonator and a target resonator.

As an example, the wireless power transceiver may be disposed in a wall and thus, it is possible to solve difficulties in wireless power transmission caused by various obstacles in an in-building environment. For example, when the wireless power transceiver is installed inside a wall, a power may be wirelessly transmitted from a source resonator to a target resonator located outside the wall.

As another example, the wireless power transceiver may be installed in one side of various electronic appliances and thus, it is possible to wirelessly transmit power to a plurality of target resonators, and to efficiently distribute and transmit the power based on power consumed by each of the plurality of target resonators.

Hereinafter, various structures of a resonator will be described with reference to FIGS. 7 through 13B. The source resonator, the target resonator, the receiving resonator, and the transmitting resonator that are described above may be configured as any of the resonators shown in FIGS. 7 through 13B. It should also be appreciated that the resonators shown in FIGS. 7 through 13B are merely for purposes of example, and the present description is not limited thereto.

FIG. 7 illustrates an example of a resonator that has a two-dimensional (2D) structure. Referring to FIG. 7, the resonator 700 includes a transmission line, a capacitor 720, a matcher 730, and conductors 741 and 742. In this example, the transmission line includes a first signal conducting portion 711, a second signal conducting portion 712, and a ground conducting portion 713.

For example, the capacitor 720 may be inserted in series between the first signal conducting portion 711 and the second signal conducting portion 712. In this example, an electric field may be confined within the capacitor 720. Generally, the transmission line may include at least one conductor in an upper portion of the transmission line, and may also include at least one conductor in a lower portion of the transmission line. As an example, current may flow through the at least one conductor disposed in the upper portion of the transmission line, meanwhile the at least one conductor disposed in the lower portion of the transmission may be electrically grounded. A conductor disposed in an upper portion of the transmission line may be separated into and thereby be referred to as the first signal conducting portion 711 and the second signal conducting portion 712. A conductor disposed in the lower portion of the transmission line may be referred to as the ground conducting portion 713.

As shown in FIG. 7, the resonator 700 may have the 2D structure. The transmission line may include the first signal conducting portion 711 and the second signal conducting portion 712 in the upper portion of the transmission line, and may include the ground conducting portion 713 in the lower portion of the transmission line. For example, the first signal conducting portion 711 and the second signal conducting portion 712 may be disposed to face the ground conducting portion 713. The current may flow through the first signal conducting portion 711 and the second signal conducting portion 712.

One end of the first signal conducting portion 711 may be shorted to the conductor 742, and another end of the first signal conducting portion 711 may be connected to the capacitor 720. One end of the second signal conducting portion 712 may be grounded to the conductor 741, and another end of the second signal conducting portion 712 may be connected to the capacitor 720. Accordingly, the first signal conducting portion 711, the second signal conducting portion 712, the ground conducting portion 713, and the conductors 741 and 742 may be connected to each other such that the resonator 700 may have an electrically closed-loop structure. The term "loop structure" may include a polygonal structure, for example, a circular structure, a rectangular structure, and the like. Having "a loop structure" may indicate a circuit that is electrically closed.

The capacitor 720 may be inserted into an intermediate portion of the transmission line. For example, the capacitor 720 may be inserted into a space between the first signal conducting portion 711 and the second signal conducting portion 712. For example, the capacitor 720 may have a shape of a lumped element, a distributed element, and the like. As an example, a distributed capacitor having the shape of the distributed element may include zigzagged conductor lines and a dielectric material having a relatively high permittivity between the zigzagged conductor lines.

For example, when the capacitor 720 is inserted into the transmission line, the resonator 700 may have a property of a metamaterial. The metamaterial indicates a material having a predetermined electrical property that cannot be discovered in nature and thus, may have an artificially designed structure. An electromagnetic characteristic of all the materials existing in nature may have a unique magnetic permeability or a unique permittivity. Most materials may have a positive magnetic permeability or a positive permittivity. In the case of most materials, a right hand rule may be applied to an electric field, a magnetic field, and a pointing vector and thus, the corresponding materials may be referred to as right handed materials (RHMs). However, the metamaterial has a magnetic permeability or a permittivity absent in nature and thus, may be classified into, for example, an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

When a capacitance of the capacitor inserted as the lumped element is determined, the resonator 700 may have the characteristic of the metamaterial. Because the resonator 700 may have a negative magnetic permeability by adjusting the capacitance of the capacitor 720, the resonator 700 may also be referred to as an MNG resonator.

Various criteria may be applied to determine the capacitance of the capacitor 720. For example, the various criteria may include a criterion for enabling the resonator 700 to have the characteristic of the metamaterial, a criterion for enabling the resonator 700 to have a negative magnetic permeability in a target frequency, a criterion for enabling the resonator 700 to have a zeroth order resonance characteristic in the target frequency, and the like. For example, the capacitance of the capacitor 720 may be determined based on at least one of the aforementioned criterion.

The resonator 700, also referred to as the MNG resonator 700, may have a zeroth order resonance characteristic. For example, the resonator may have a resonance frequency in which a propagation constant is "0". Because the resonator 700 may have the zeroth order resonance characteristic, the resonance frequency may be independent with respect to a physical size of the MNG resonator 700. Based on the design of the capacitor 720, the MNG resonator 700 may sufficiently change the resonance frequency. Accordingly, the physical size of the MNG resonator 700 may not be changed.

In a near field, the electric field may be concentrated on the capacitor 720 inserted into the transmission line. Accordingly, due to the capacitor 720, the magnetic field may become dominant in the near field. For example, the MNG resonator 700 may have a relatively high Q-factor using the capacitor 720 of the lumped element and thus, it is possible to enhance an efficiency of power transmission. In this example, the Q-factor indicates a level of an ohmic loss or a ratio of a reactance with respect to a resistance in the wireless power transmission. It should be understood that the efficiency of the wireless power transmission may increase according to an increase in the Q-factor.

The MNG resonator 700 may include the matcher 730 for impedance matching. The matcher 730 may adjust a strength of a magnetic field of the MNG resonator 700. An impedance of the MNG resonator 700 may be determined by the matcher 730. A current may flow in the MNG resonator 700 via a connector and the current may flow out from the MNG resonator 700 via the connector. The connector may be physically connected to the ground conducting portion 713 or the matcher 730.

For example, as shown in FIG. 7, the matcher 730 may be positioned integrally within the loop formed by the loop structure of the resonator 700. For example, the matcher 730 may adjust the impedance of the resonator 700 by changing the physical shape of the matcher 730. In other words, the matcher 730 may be configured in various forms so that dimensions of the loop may be changed. For example, the matcher 730 may include the conductor 731 for the impedance matching in a location separate from the ground conducting portion 713. The matcher 730 and the conductor 731 are separated by a distance h. For example, the conductor 731 may be formed integrally with the ground conducting portion 713. The impedance of the resonator 700 may be changed by adjusting the distance h.

Although not illustrated in FIG. 7, a controller may be provided to control the matcher 730. For example, the matcher 730 may change the physical shape of the matcher 730 based on a control signal generated by the controller. For example, the distance h between the conductor 731 of the matcher 730 and the ground conducting portion 713 may increase or decrease based on the control signal. Accordingly, the physical shape of the matcher 730 may be changed which may cause the impedance of the resonator 700 to be adjusted. The controller may generate the control signal based on various factors, which are described further herein.

As shown in FIG. 7, the matcher 730 may be configured as a passive element such as the conductor 731. For example, the matcher 730 may be configured as an active element such as a diode, a transistor, and the like. When the active element is included in the matcher 730, the active element may be driven based on the control signal generated by the controller, and the impedance of the resonator 700 may be adjusted based on the control signal. For example, an active element such as a diode may be included in the matcher 730. The impedance of the resonator 700 may be adjusted based on whether the diode is in an 'on' state or in an 'off' state.

Although not illustrated in FIG. 7, a magnetic core may be further provided to pass through the MNG resonator 700. The magnetic core may perform a function of increasing a power transmission distance.

Figure 8:
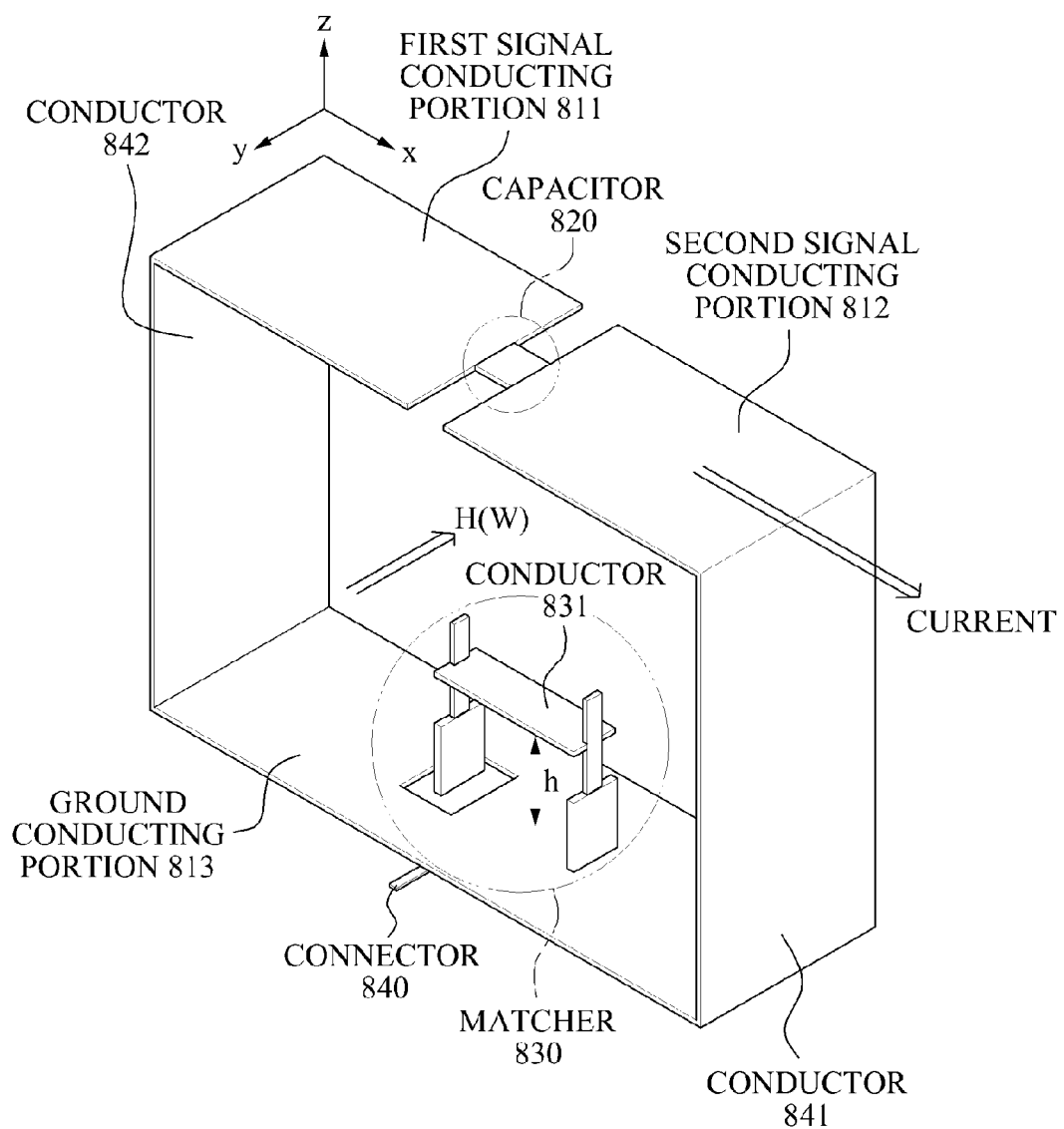
FIG. 8 is a diagram illustrating an example of a resonator that has a three-dimensional (3D) structure.

FIG. 8 illustrates an example of a resonator that has a three-dimensional (3D) structure.

Referring to FIG. 8, the resonator 800 may include a transmission line and a capacitor 820. In this example, the transmission line includes a first signal conducting portion 811, a second signal conducting portion 812, and a ground conducting portion 813. The capacitor 820 may be inserted in series between the first signal conducting portion 811 and the second signal conducting portion 812 of the transmission link. In this example, an electric field may be confined within the capacitor 820.

As shown in FIG. 8, the resonator 800 has the 3D structure. The transmission line may include the first signal conducting portion 811 and the second signal conducting portion 812 in an upper portion of the resonator 800, and may include the ground conducting portion 813 in a lower portion of the resonator 800. The first signal conducting portion 811 and the second signal conducting portion 812 may be disposed to face the ground conducting portion 813. For example, current may flow in an x direction through the first signal conducting portion 811 and the second signal conducting portion 812. Based on the current, a magnetic field H(W) may be formed in a −y direction. Alternatively, unlike the diagram of FIG. 8, the magnetic field H(W) may be formed in a +y direction.

One end of the first signal conducting portion 811 may be shorted to the conductor 842, and another end of the first signal conducting portion 811 may be connected to the capacitor 820. One end of the second signal conducting portion 812 may be grounded to the conductor 841, and another end of the second signal conducting portion 812 may be connected to the capacitor 820. Accordingly, the first signal conducting portion 811, the second signal conducting portion 812, the ground conducting portion 813, and the conductors 841 and 842 may be connected to each other and the resonator 800 may have an electrically closed-loop structure. The term "loop structure" may include a polygonal structure, for example, a circular structure, a rectangular structure, and the like. Having "a loop structure" may indicate a circuit that is electrically closed.

As shown in FIG. 8, the capacitor 820 may be inserted between the first signal conducting portion 811 and the second signal conducting portion 812. The capacitor 820 may be inserted into a space between the first signal conducting portion 811 and the second signal conducting portion 812. For example, the capacitor 820 may have a shape of a lumped element, a distributed element, and the like. For example, a distributed capacitor having the shape of the distributed element may include zigzagged conductor lines and a dielectric material having a relatively high permittivity between the zigzagged conductor lines.

As the capacitor 820 is inserted into the transmission line, the resonator 800 may have a property of a metamaterial.

For example, when the capacitance of the capacitor inserted as the lumped element is determined, the resonator 800 may have the characteristic of the metamaterial. Because the resonator 800 may have a negative magnetic permeability by adjusting the capacitance of the capacitor 820, the resonator 800 may also be referred to as an MNG resonator. Various criteria may be applied to determine the capacitance of the capacitor 820. For example, the various criteria may include a criterion for enabling the resonator 800 to have the characteristic of the metamaterial, a criterion for enabling the resonator 800 to have a negative magnetic permeability in a target frequency, a criterion enabling the resonator 800 to have a zeroth order resonance characteristic in the target frequency, and the like. For example, the capacitance of the capacitor 820 may be determined based on at least one of the aforementioned criterion.

The resonator 800, also referred to as the MNG resonator 800, may have a zeroth order resonance characteristic. For example, the resonator 800 may have a resonance frequency in which a propagation constant is "0". Because the resonator 800 may have the zeroth order resonance characteristic, the resonance frequency may be independent with respect to a physical size of the MNG resonator 800. Based on the design of the capacitor 820, the MNG resonator 800 may sufficiently change the resonance frequency. Accordingly, the physical size of the MNG resonator 800 may not be changed.

Referring to the MNG resonator 800 of FIG. 8, in a near field, the electric field may be concentrated on the capacitor 820 inserted into the transmission line. Accordingly, due to the capacitor 820, the magnetic field may become dominant in the near field. For example, because the MNG resonator 800 having the zeroth-order resonance characteristic may have characteristics similar to a magnetic dipole, the magnetic field may become dominant in the near field. A relatively small amount of the electric field formed due to the insertion of the capacitor 820 may be concentrated on the capacitor 820 and thus, the magnetic field may become further dominant.

The MNG resonator 800 may include the matcher 830 for impedance matching. The matcher 830 may adjust the strength of magnetic field of the MNG resonator 800. An impedance of the MNG resonator 800 may be determined by the matcher 830. A current may flow in the MNG resonator 800 via a connector 840 and the current may flow out from the MNG resonator 800 via the connector 840. The connector 840 may be connected to the ground conducting portion 813 or the matcher 830.

For example, as shown in FIG. 8, the matcher 830 may be positioned integrally within the loop formed by the loop structure of the resonator 800. For example, the matcher 830 may adjust the impedance of the resonator 800 by changing the physical shape of the matcher 830. In other words, the matcher 830 may be configured in various forms so that dimensions of the loop may be changed. For example, the matcher 830 may include the conductor 831 for the impedance matching in a location separate from the ground conducting portion 813. In this example, the matcher 830 and the conductor 831 are separated by a distance h. For example, the conductor 831 may be formed integrally with the ground conducting portion 813. The impedance of the resonator 800 may be changed by adjusting the distance h.

Although not illustrated in FIG. 8, a controller may be provided to control the matcher 830. For example, the matcher 830 may change the physical shape of the matcher 830 based on a control signal generated by the controller. For example, the distance h between the conductor 831 of the matcher 830 and the ground conducting portion 813 may increase or decrease based on the control signal. Accordingly, the physical shape of the matcher 830 may be changed and the impedance of the resonator 800 may be adjusted. The distance h between the conductor 831 of the matcher 830 and the ground conducting portion 831 may be adjusted using a variety of schemes. As one example, a plurality of conductors may be included in the matcher 830 and the distance h may be adjusted by adaptively activating one of the conductors. As another example, the distance h may be adjusted by adjusting the physical location of the conductor 831 up and down. The distance h may be controlled based on the control signal of the controller. The controller may generate the control signal using various factors. An example of the controller generating the control signal is described further herein.

As shown in FIG. 8, the matcher 830 may be configured as a passive element such as the conductor 831. For example, the matcher 830 may be configured as an active element such as a diode, a transistor, and the like. When the active element is included in the matcher 830, the active element may be driven based on the control signal generated by the controller, and the impedance of the resonator 800 may be adjusted based on the control signal. For example, an active element such as a diode may be included in the matcher 830. For example, the impedance of the resonator 800 may be adjusted based on whether the diode is in an 'on' state or in an 'off' state.

Although not illustrated in FIG. 8, a magnetic core may be further provided to pass through the resonator 800 configured as the MNG resonator. The magnetic core may perform a function of increasing a power transmission distance.

Figure 9:
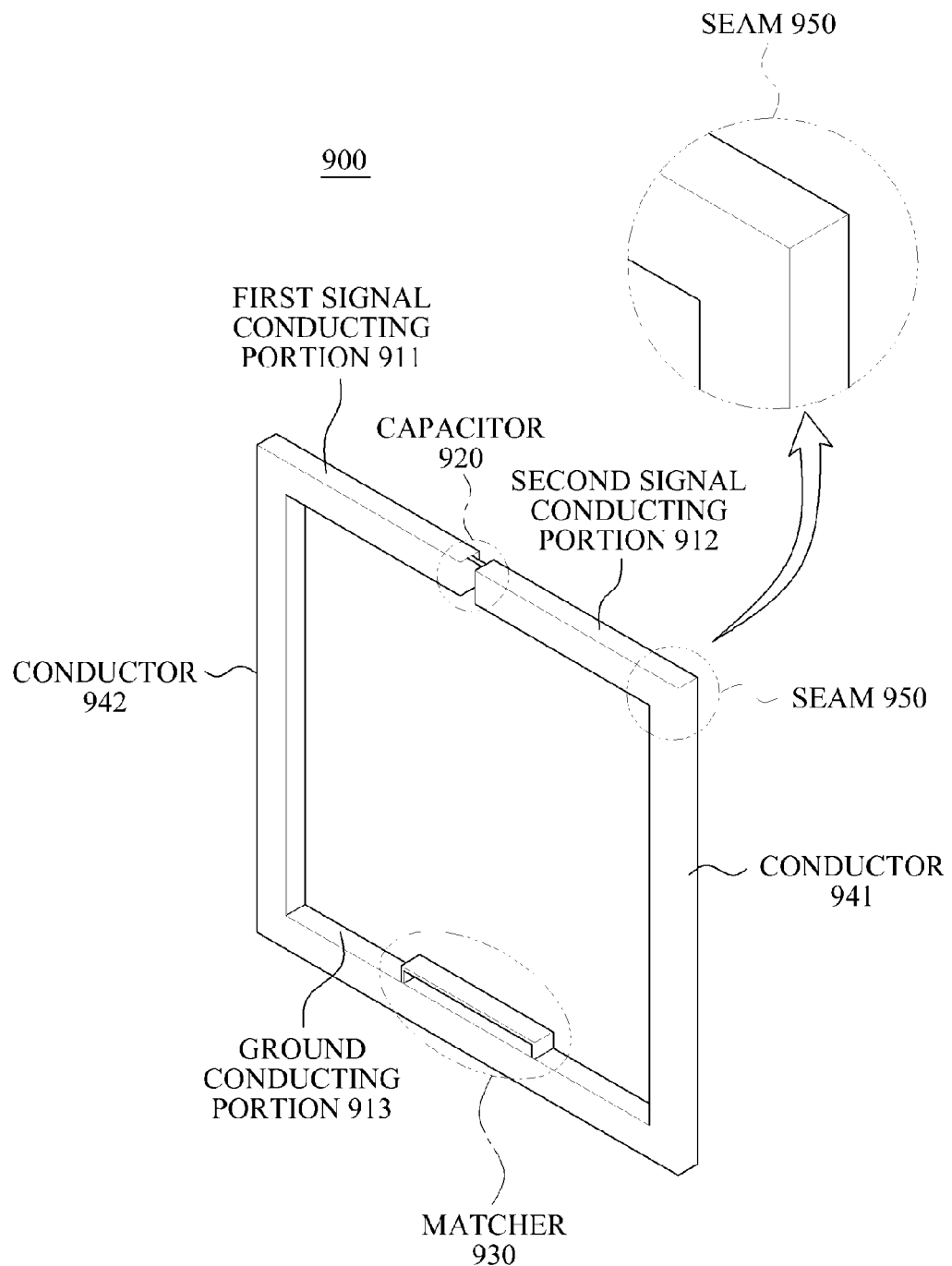
FIG. 9 is a diagram illustrating an example of a bulky-type resonator for wireless power transmission.

FIG. 9 illustrates an example of a bulky-type resonator for wireless power transmission.

Referring to FIG. 9, a first signal conducting portion 911 and a second signal conducting portion 912 may be integrally formed instead of being separately manufactured. Thus, the first signal conducting portion 911 and the second signal conducting portion 912 may be connected to each other. Similarly, the second signal conducting portion 912 and the conductor 941 may also be integrally manufactured.

When the second signal conducting portion 912 and the conductor 941 are separately manufactured and then are connected to each other, a loss of conduction may occur, for example, due to a seam 950. The second signal conducting portion 912 and the conductor 941 may be connected to each other without using a separate seam, that is, they may be seamlessly connected to each other. Accordingly, it is possible to decrease a conductor loss caused by the seam 950. For example, the second signal conducting portion 912 and the ground conducting portion 931 may be seamlessly and integrally manufactured. Similarly, the first signal conducting portion 911 and the ground conducting portion 931 may be seamlessly and integrally manufactured.

Referring to FIG. 9, a seamless connection connecting at least two partitions into an integrated form may be referred to as a bulky type.

Figure 10:
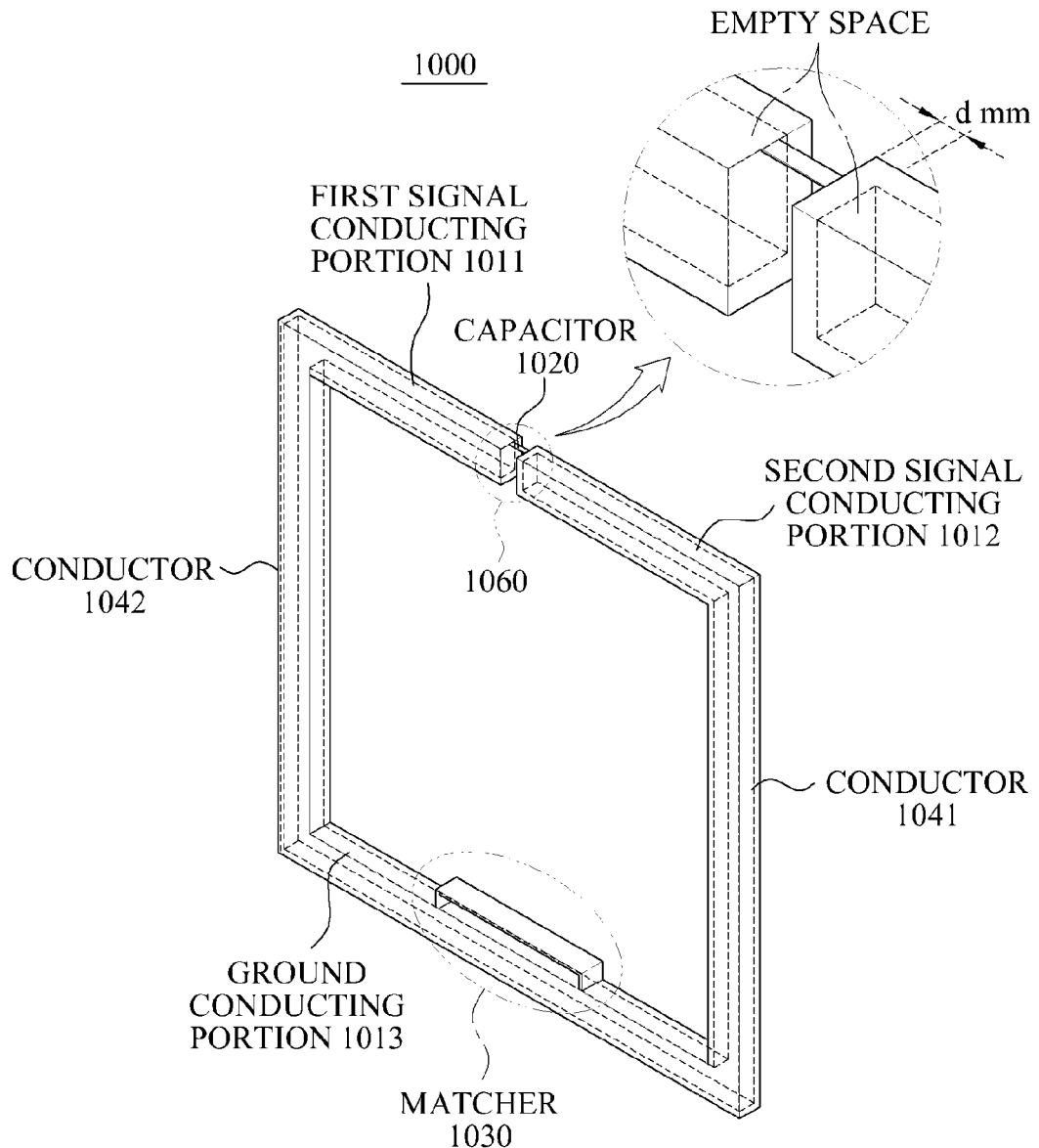
FIG. 10 is a diagram illustrating an example of a hollow-type resonator for wireless power transmission.

FIG. 10 illustrates an example of a hollow-type resonator for wireless power transmission.

Referring to FIG. 10, each of a first signal conducting portion 1011, a second signal conducting portion 1012, a ground conducting portion 1013, and conductors 1041 and 1042 of the resonator 1000 may include an empty or hollow space inside.

In a given resonance frequency, an active current may be modeled to flow in only a portion of the first signal conducting portion 1011 instead of all of the first signal conducting portion 1011, only a portion of the second signal conducting portion 1012 instead of all of the second signal conducting portion 1012, only a portion of the ground conducting portion 1013 instead of all of the ground conducting portion 1013, and only a portion of the conductors 1041 and 1042 instead of all of the conductors 1041 and 1042. For example, when a depth of each of the first signal conducting portion 1011, the second signal conducting portion 1012, the ground conducting portion 1013, and the conductors 1041 and 1042 are significantly deeper than a corresponding skin depth in the given resonance frequency, it may be ineffective. The significantly deeper depth may increase a weight or manufacturing costs of the resonator 1000.

Accordingly, in the given resonance frequency, the depth of each of the first signal to conducting portion 1011, the second signal conducting portion 1012, the ground conducting portion 1013, and the conductors 1041 and 1042 may be determined based on the corresponding skin depth of each of the first signal conducting portion 1011, the second signal conducting portion 1012, the ground conducting portion 1013, and the conductors 1041 and 1042. When each of the first signal conducting portion 1011, the second signal conducting portion 1012, the ground conducting portion 1013, and the conductors 1041 and 1042 have a depth that is deeper than a corresponding skin depth, the resonator 1000 may become light, and manufacturing costs of the resonator 1000 may also decrease.

For example, as shown in FIG. 10, the depth of the second signal conducting portion 1012 may be determined as "d" millimeters and d may be determined according to $$d = \frac{1}{\sqrt{\pi f \mu \sigma}}.$$

In this example, f denotes a frequency, μ denotes a magnetic permeability, and σ denotes a conductor constant. As an example, when the first signal conducting portion 1011, the second signal conducting portion 1012, the ground conducting portion 1013, and the conductors 1041 and 1042 are made of a copper and have a conductivity of $5.8 \times 10^7$ siemens per meter (S·m$^{-1}$), the skin depth may be about 0.6 mm with respect to 10 kHz of the resonance frequency and the skin depth may be about 0.006 mm with respect to 100 MHz of the resonance frequency.

Figure 11:
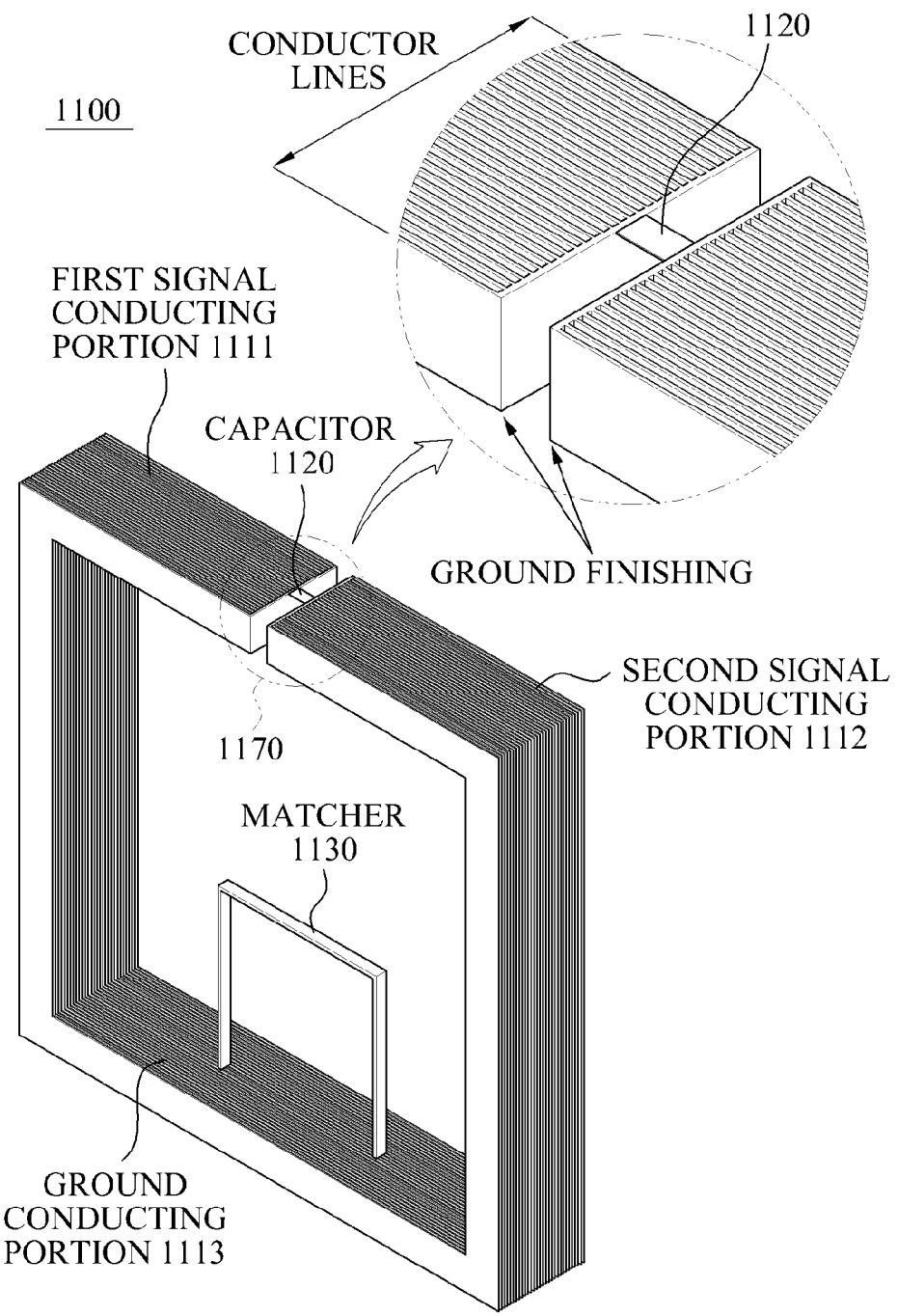
FIG. 11 is a diagram illustrating an example of a resonator for wireless power transmission using a parallel-sheet.

FIG. 11 illustrates an example of a resonator for wireless power transmission using a parallel-sheet.

Referring to FIG. 11, the parallel-sheet may be applicable to each of a first signal conducting portion 1111 and a second signal conducting portion 1112 included in the resonator 1100.

For example, each of the first signal conducting portion 1111 and the second signal conducting portion 1112 may not be perfect conductors and thus, may have a resistance. Due to the resistance, an ohmic loss may occur. The ohmic loss may decrease a Q-factor and also decrease a coupling effect.

By applying the parallel-sheet to each of the first signal conducting portion 1111 and the second signal conducting portion 1112, it is possible to decrease the ohmic loss, and to increase the Q-factor and the coupling effect. Referring to a portion 1170 indicated by a circle, when the parallel-sheet is applied, each of the first signal conducting portion 1111 and the second signal conducting portion 1112 may include a plurality of conductor lines. For example, the plurality of conductor lines may be disposed in parallel, and may be shorted to each other at an end portion of each of the first signal conducting portion 1111 and the second signal conducting portion 1112.

As described above, when the parallel-sheet is applied to each of the first signal conducting portion 1111 and the second signal conducting portion 1112, the plurality of conductor lines may be disposed in parallel. Accordingly, a sum of resistances having the conductor lines may decrease. Consequently, the resistance loss may decrease, and the Q-factor and the coupling effect may increase.

Figure 12:
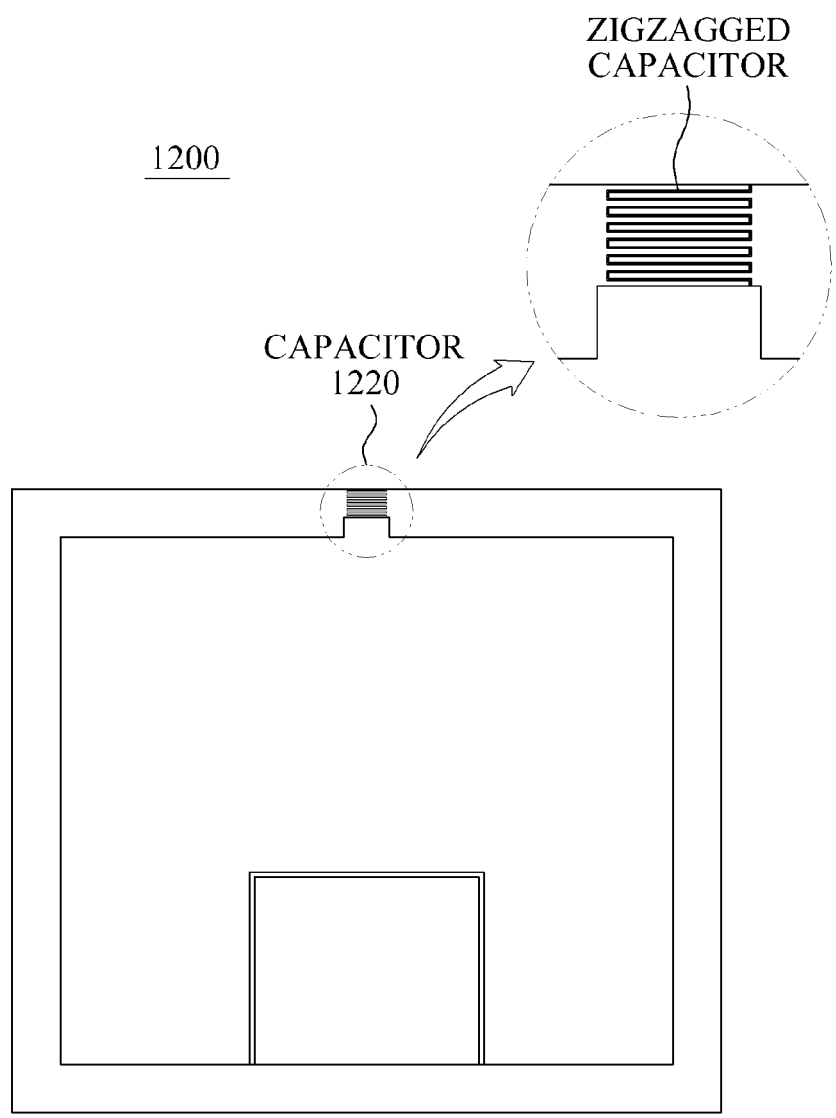
FIG. 12 is a diagram illustrating an example of a resonator for wireless power transmission that includes a distributed capacitor.

FIG. 12 illustrates an example of a resonator for wireless power transmission that includes a distributed capacitor.

Referring to FIG. 12, a capacitor 1220 included in the resonator 1200 for the wireless power transmission may be a distributed capacitor. A capacitor that is a lumped element may have a relatively high equivalent series resistance (ESR). A variety of schemes have been proposed to decrease the ESR contained in the capacitor of the lumped element. For example, using the capacitor 1220 as a distributed element, it is possible to decrease the ESR. A loss caused by the ESR may decrease a Q-factor and a coupling effect.

As shown in FIG. 12, the capacitor 1220 as the distributed element may have a zigzagged structure. For example, the capacitor 1220 may be configured as a conductive line and a conductor having the zigzagged structure.

As shown in FIG. 12, by employing the capacitor 1220 as the distributed element, it is possible to decrease the loss occurring due to the ESR. In addition, by disposing a plurality of capacitors as lumped elements, it is possible to decrease the loss occurring due to the ESR. Because a resistance of each of the capacitors as the lumped elements decreases through a parallel connection, active resistances of parallel-connected capacitors as the lumped elements may also decrease and loss occurring due to the ESR may decrease. For example, by employing ten capacitors of 1 pF instead of using a single capacitor of 10 pF, it is possible to decrease the loss occurring due to the ESR.

Figure 13A:
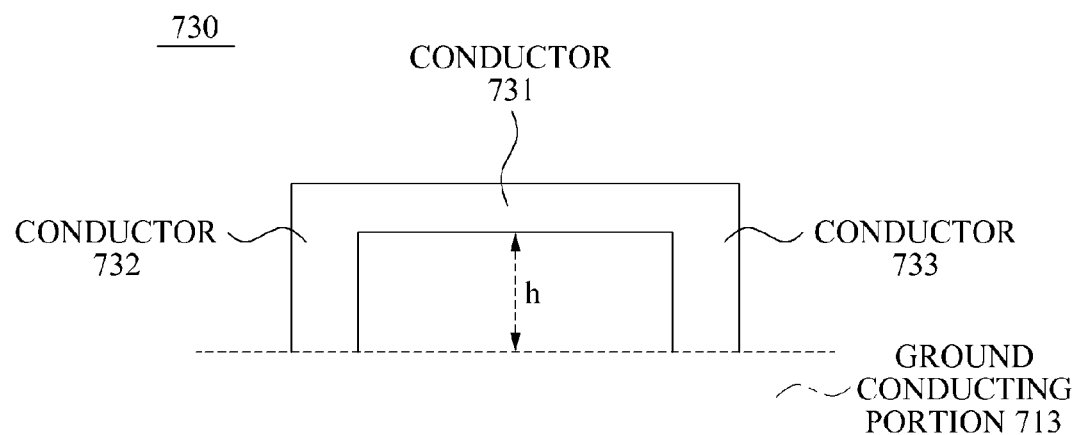
FIGS. 13A and 13B are diagrams illustrating examples of matchers provided in the resonator of FIG. 7 and the resonator of FIG. 8, respectively.
Figure 13B:
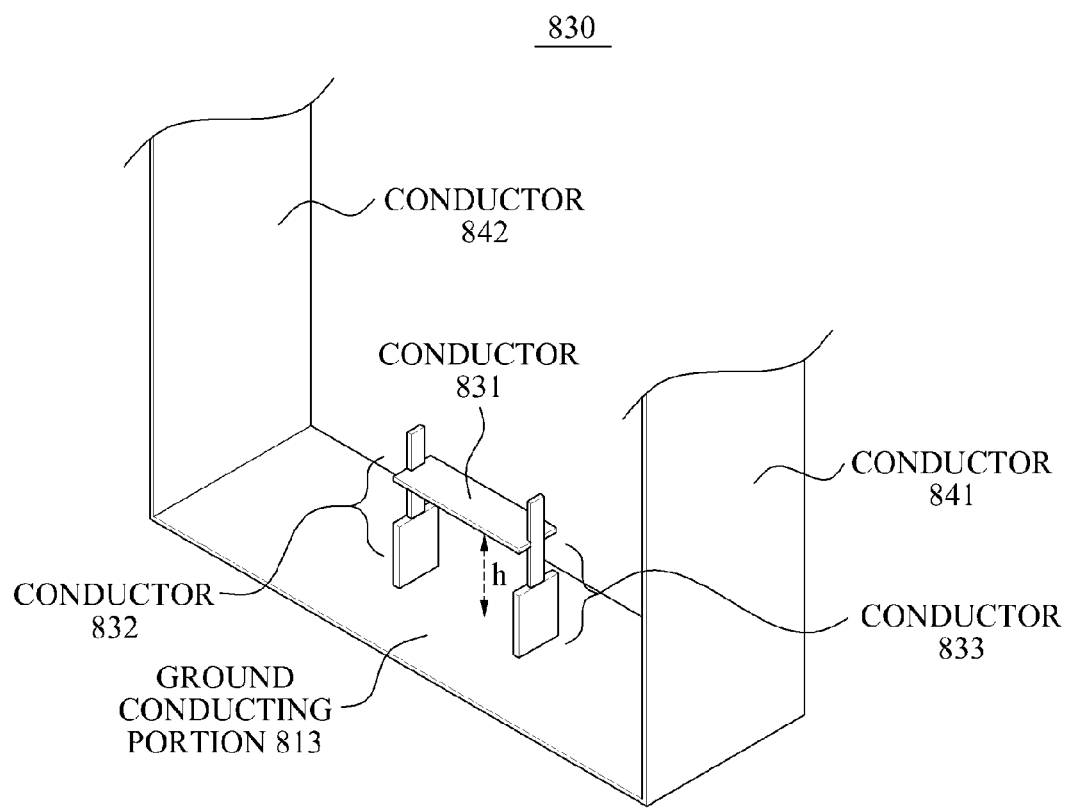

FIG. 13A illustrates an example of the matcher 730 used in the resonator 700 provided in the 2D structure of FIG. 7, and FIG. 13B illustrates an example of the matcher 830 used in the resonator 800 provided in the 3D structure of FIG. 8.

For example, FIG. 13A illustrates a portion of the 2D resonator including the matcher 730, and FIG. 13B illustrates a portion of the 3D resonator of FIG. 8 including the matcher 830.

Referring to FIG. 13A, the matcher 730 includes the conductor 731, a conductor 732, and a conductor 733. The conductors 732 and 733 may be connected to the ground conducting portion 713 and the conductor 731. For example, the impedance of the 2D resonator may be determined based on a distance h between the conductor 731 and the ground conducting portion 713. The distance h between the conductor 731 and the ground conducting portion 713 may be controlled by the controller. For example, the distance h between the conductor 731 and the ground conducting portion 713 may be adjusted using a variety of schemes. For example, the variety of schemes may include a scheme of adjusting the distance h by adaptively activating one of the conductors 731, 732, and 733, a scheme of adjusting the physical location of the conductor 731 up and down, and the like.

Referring to FIG. 13B, the matcher 830 may include the conductor 831, a conductor 832, and a conductor 833. The conductors 832 and 833 may be connected to the ground conducting portion 813 and the conductor 831. The conductors 832 and 833 may be connected to the ground conducting portion 813 and the conductor 831. For example, the impedance of the 3D resonator may be determined based on a distance h between the conductor 831 and the ground conducting portion 813. For example, the distance h between the conductor 831 and the ground conducting portion 813 may be controlled by the controller. Similar to the matcher 730 included in the 2D structured resonator, in the matcher 830 included in the 3D structured resonator, the distance h between the conductor 831 and the ground conducting portion 813 may be adjusted using a variety of schemes. For example, the variety of schemes may include a scheme of adjusting the distance h by adaptively activating one of the conductors 831, 832, and 833, a scheme of adjusting the physical location of the conductor 831 up and down, and the like.

Although not illustrated in FIGS. 13A and 13B, the matcher may include an active element. A scheme of adjusting an impedance of a resonator using the active element is previously described herein. For example, the impedance of the resonator may be adjusted by changing a path of a current flowing through the matcher using the active element.

Figure 14:
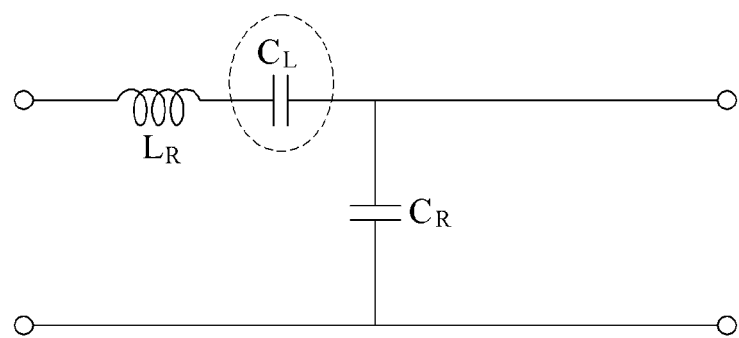
FIG. 14 is a diagram illustrating an example of an equivalent circuit of a transmission line into which a capacitor of FIG. 7 is inserted.

FIG. 14 illustrates an example of an equivalent circuit of the resonator 700 for the wireless power transmission of FIG. 7.

The resonator 700 for the wireless power transmission may be modeled to the equivalent circuit of FIG. 14. In the equivalent circuit of FIG. 14, $C_L$ denotes a capacitor that is inserted in a form of a lumped element in the middle of the transmission line of FIG. 7.

In this example, the resonator 700 may have a zeroth resonance characteristic. For example, when a propagation constant is "0", the resonator 700 may be assumed to have $\omega_{MZR}$ as a resonance frequency. The resonance frequency $\omega_{MZR}$ may be expressed by Equation 3.

$$\omega_{MZR} = \frac{1}{\sqrt{L_R C_L}} \quad \text{[Equation 3]}$$

In Equation 3, MZR denotes a Mu zero resonator.

Referring to Equation 3, the resonance frequency $\omega_{MZR}$ of the resonator 700 may be determined by $L_R/C_L$. A physical size of the resonator 700 and the resonance frequency $\omega_{MZR}$ may be independent with respect to each other. Because the physical sizes are independent with respect to each other, the physical size of the resonator 700 may be sufficiently reduced.

Described herein is a wireless power transceiver that may be disposed between a source resonator and a target resonator and may improve a wireless power transmission efficiency.

Additionally a wireless power transceiver may distribute a power transmitted wirelessly between a source resonator and a target resonator.

Furthermore, a wireless power transceiver may widen a wireless power transmission coverage of a source resonator.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power transceiver, comprising:
   a power receiver comprising a receiving resonator that receives an inbound power from a source resonator;
   a power transmitter comprising a transmitting resonator that transmits an outbound power to a target resonator;
   a coupling controller configured to control a coupling frequency between the target resonator and the transmitting resonator; and an isolator configured to electrically isolate the power receiver and the power transmitter to reduce interference between the receiving resonator and the transmitting resonator.

2. The wireless power transceiver of claim 1, wherein the coupling controller controls a frequency such that a reflected wave of a transmission signal transmitted from the transmitting resonator to the target resonator has a minimum amplitude, and sets the controlled frequency as the coupling frequency.

3. The wireless power transceiver of claim 1, wherein the coupling controller controls a frequency such that a reflected wave of a transmission signal transmitted from the transmitting resonator to the target resonator is in phase with the transmission signal, and sets the controlled frequency as the coupling frequency.

4. The wireless power transceiver of claim 1, wherein the coupling controller controls a frequency such that a reflected wave of a transmission signal transmitted from the transmitting resonator to the target resonator has a minimum power, and sets the controlled frequency as the coupling frequency.

5. The wireless power transceiver of claim 4, wherein the coupling controller comprises a power detector to measure a power of the reflected wave.

6. The wireless power transceiver of claim 1, wherein the power transmitter further comprises a power distribution circuit to control a magnitude of the outbound power.

7. The wireless power transceiver of claim 1, wherein the power transmitter further comprises a directivity controller to control a direction of the outbound power.

8. The wireless power transceiver of claim 1, wherein the coupling controller comprises a Phase Locked Loop (PLL) circuit to control the coupling frequency.

9. The wireless power transceiver of claim 1, further comprising:
a load to adjust an inbound power transmission distance and an outbound power transmission distance.

10. The wireless power transceiver of claim 1, wherein at least one of the source resonator, the target resonator, the receiving resonator, and the transmitting resonator comprises:
a transmission line comprising a first signal conducting portion, a second signal conducting portion, and a ground conducting portion, and the ground conducting portion corresponds to the first signal conducting portion and the second signal conducting portion;
a first conductor to electrically connect the first signal conducting portion and the ground conducting portion;
a second conductor to electrically connect the second signal conducting portion and the ground conducting portion; and
at least one capacitor inserted between the first signal conducting portion and the second signal conducting portion, and the at least one capacitor is positioned in series with respect to a current flowing between the first signal conducting portion and the second signal conducting portion.

11. The wireless power transceiver of claim 10, wherein the transmission line, the first conductor, and the second conductor form a loop structure.

12. The wireless power transceiver of claim 10, wherein the transmission line, the first conductor, and the second conductor form a rectangular loop structure.

13. The wireless power transceiver of claim 12, further comprising:
a matcher to determine an impedance of a wireless power resonator, and the matcher is positioned integrally within a loop formed by the transmission line, the first conductor, and the second conductor.

14. The wireless power transceiver of claim 13, wherein the matcher has a rectangular shape.

15. The wireless power transceiver of claim 13, wherein the matcher changes a physical shape of the matcher, based on a control signal generated by a controller, in order to adjust the impedance of the wireless power resonator.

16. The wireless power transceiver of claim 15, wherein the controller generates the control signal based on a state of an opposite resonator that receives or transmits power from or to the wireless power resonator.

17. The wireless power transceiver of claim 15, wherein the controller generates the control signal based on at least one of a distance between the wireless power resonator and a wireless power resonator of a wireless power receiver, a reflection coefficient of a wave transmitted from the wireless power resonator to the wireless power resonator of the wireless power receiver, a power transmission gain between the wireless power resonator and the wireless power resonator of the wireless power receiver, and a coupling efficiency between the wireless power resonator and the wireless power resonator of the wireless power receiver.

18. The wireless power transceiver of claim 13, wherein the matcher comprises a conductor for the impedance matching in a location separated from the ground conducting portion by a predetermined distance, and the conductor is formed integrally with the ground conducting portion, and
wherein the impedance of the wireless power resonator is adjusted based on the distance between the ground conducting portion and the conductor for the impedance matching.

19. The wireless power transceiver of claim 13, wherein the matcher comprises at least one active element to adjust the impedance of the wireless power resonator based on a control signal generated by a controller.

20. The wireless power transceiver of claim 10, wherein the at least one capacitor is inserted as a lumped element between the first signal conducting portion and the second signal conducting portion.

21. The wireless power transceiver of claim 10, wherein the at least one capacitor is configured as a distributed element and has a zigzagged structure.

22. The wireless power transceiver of claim 10, wherein a capacitance of the at least one capacitor is set based on at least one of a criterion for enabling the wireless power resonator to have a characteristic of the metamaterial, a criterion for enabling the wireless power resonator to have a negative magnetic permeability in a target frequency, and a criterion for enabling the wireless power resonator to have a zeroth order resonance characteristic in the target frequency.

23. The wireless power transceiver of claim 10, wherein a plurality of conductor lines are disposed in parallel on a surface of the first signal conducting portion and on a surface of the second signal conducting portion, and are shorted to each other at an end portion of each of the first signal conducting portion and the second signal conducting portion.

24. The wireless power transceiver of claim 10, wherein the first signal conducting portion and the ground conducting portion are seamlessly connected to each other, and the second signal conducting portion and the ground conducting portion are seamlessly connected to each other.

25. The wireless power transceiver of claim 10, wherein at least one of the first signal conducting portion, the second signal conducting portion, and the ground conducting portion comprises a hollow space inside.

26. The wireless power transceiver of claim 10, further comprising:
a magnetic core that passes through a space between the first signal conducting portion, the second signal conducting portion, and the ground conducting portion.

27. The wireless power transceiver of claim 10, wherein, when the wireless power resonator comprises at least two transmission lines, the at least two transmission lines are connected in series, in parallel, or in a spiral form, and at least one capacitor is inserted between a first signal conducting portion and a second signal conducting portion that are comprised in each of the at least two transmission lines.

28. A wireless power system, comprising:
at least one source resonator;
at least one target resonator; and
a wireless power transceiver configured to receive an inbound power from the at least one source resonator via a power receiver, to transmit an outbound power to the at least one target resonator via a power receiver, and to control a coupling frequency between the at least one source resonator and the at least one target resonator, wherein the power receiver and the power transmitter are electrically isolated from each other to reduce interference between the power receiver and the power transmitter.

29. A wireless power transceiver comprising:
a power receiver comprising a receiving resonator that receives an inbound power from a source resonator;
a power transmitter comprising a transmitting resonator that transmits an outbound power to a target resonator; and
a coupling controller to control a coupling frequency between the target resonator and the transmitting resonator,
wherein the coupling controller is configured to control a frequency such that a reflected wave of a transmission signal transmitted from the transmitting resonator to the target resonator has a minimum amplitude, and to set the controlled frequency as the coupling frequency.

* * * * *